United States Patent

Murakami et al.

[11] Patent Number: 5,892,921
[45] Date of Patent: Apr. 6, 1999

[54] PRESTAGING METHOD, BUFFER MANAGEMENT METHOD AND FILE SYSTEM

[75] Inventors: Takeo Murakami; Satoru Torii, both of Kawasaki, Japan

[73] Assignee: Fujitsu Limited, Kawasaki, Japan

[21] Appl. No.: 791,781

[22] Filed: Jan. 29, 1997

Related U.S. Application Data

[62] Division of Ser. No. 576,402, Dec. 21, 1995, Pat. No. 5,652,916, which is a continuation of Ser. No. 77,056, Jun. 16, 1993, abandoned.

[30] Foreign Application Priority Data

Jun. 29, 1992 [JP] Japan ..................................... 4-171054
Apr. 13, 1993 [JP] Japan ..................................... 5-086484

[51] Int. Cl.⁶ ...................................................... G06F 17/30
[52] U.S. Cl. ................................ 395/200.64; 395/200.65; 395/200.66; 395/200.6; 395/872
[58] Field of Search ........................ 395/200.64, 200.65, 395/200.6, 872, 200.3

[56] References Cited

U.S. PATENT DOCUMENTS

| | | |
|---|---|---|
| 4,860,193 | 8/1989 | Bentley et al. . |
| 4,956,808 | 9/1990 | Aakre et al. . |
| 4,964,046 | 10/1990 | Mehrgardt et al. . |
| 4,993,030 | 2/1991 | Krakauer et al. . |
| 5,301,351 | 4/1994 | Jippo . |
| 5,347,637 | 9/1994 | Halford . |

Primary Examiner—Majid A. Banankhah
Attorney, Agent, or Firm—Staas & Halsey

[57] ABSTRACT

A prestaging method is adapted to a computer system comprising a central processing unit, a buffer and a secondary storage, where the prestaging method reads input data of a submitted job into the buffer from the secondary storage before executing the submitted job so as to carry out a prestaging. The prestaging method includes the steps of (a) obtaining a number of jobs for which prestagings are to be carried out simultaneously as the prestaging for the submitted job, (b) obtaining an effective data transfer speed based on the number of jobs and a data transfer speed of the secondary storage which stores the input data of the submitted job for which the prestaging is to be carried out, and (c) setting a prestaging start time from which the prestaging for the submitted job is to start by subtracting an effective data transfer time from it scheduled job start time from which the submitted job is to start, where the effective data transfer time is defined as a time which is obtained by dividing an amount of the input data by the effective data transfer speed.

24 Claims, 23 Drawing Sheets

FIG. 23

| BLOCK NUMBER | ACCESS COUNT (BYTES) |
|---|---|
| 1 | 0 |
| 2 | 8192 |
| 3 | 128 |
| 4 | 0 |
| ⋮ | ⋮ |
| n | 8192 |

PRESTAGING METHOD, BUFFER MANAGEMENT METHOD AND FILE SYSTEM

This application is a division of application Ser. No. 08/576,402, filed Dec. 21, 1995, U.S. Pat. No. 5,652,916, which is a continuation of application Ser. No. 08/077,056, filed Jun. 16, 1993, now abandoned.

BACKGROUND OF THE INVENTION

The present invention generally relates to prestaging methods, buffer management methods and file systems, and more particularly to a prestaging method for reading data at a high speed when executing a job in a computer system, a buffer management method for use in the prestaging method, and a file system which can employ such a buffer management method.

FIG. 1 shows a computer system in which a prestaging process is carried out. The improvements in the performance of the recent computer systems are notable, but on the other hand, the difference between the performances of a central processing unit (CPU) and an input/output unit is becoming greater. In a normal computer system, the measures shown in FIG. 1 are taken so as to cope with the inevitably different performances of the CPU and the input/output unit.

In FIG. 1, a main storage 12 which is coupled to a CPU 11, a disk cache 13 which is used as a secondary storage and a disk 14 which is used as a secondary storage which have different processing speeds are arranged hierarchically, so as to improve the performance of the computer system as a whole.

If it can be predicted that a large amount of data on the order of Mbytes, for example, will be read when executing a job, as in the case of a super computer, the so-called "prestaging process" (or simply "prestaging") is carried out to input the data at a high speed. According to the prestaging technique, the input data are read into the disk cache 13, which can read and write data at a high speed, from the disk 14 which can only read and write data at a low speed, before execution of the job. The timing with which this prestaging is carried out affects the job execution performance and the performance of the computer system as a whole. For this reason, there is a demand to realize a method of determining an optimum prestaging start time for starting the prestaging.

According to a conventional prestaging method, the prestaging start time was set statically before the job is submitted into the computer system. In other words, the prestaging start time was determined from the job start time, the amount of input data related to the job and a data transfer speed from the disk 14 to the disk cache 13, by assuming that the data transfer speed is fixed.

However, the load on the computer system changes dynamically, and the data transfer speed actually changes depending on the situation. For this reason, even if the prestaging is started at the preset time according to the conventional prestaging method, the prestaging may end considerably before the job start time or, the prestaging may not end in its entirety by the job start time.

If the prestaging ends considerably before the job start time, one job will occupy a region of the disk cache 13 for a long time between the end of the prestaging and the start of the job, and there is a problem in that the performance of other jobs will be deteriorated thereby. In addition, the region used by the prestaging may be taken over by another job, in which case the prestaged data will be erased. In this case, the data must be read again from the disk 14 when executing the job, and there is a problem in that the execution performance of the job deteriorates because the data can only be read from the disk 14 at the low speed.

On the other hand, if the entire prestaging does not end by the job start time, only a part of the data is prestaged. Hence, in this case, the remaining data must be read from the disk 14 when executing the job, and there is a problem in that the execution performance of the job deteriorates because the remaining data can only be read from the disk 14 at the low speed.

SUMMARY OF THE INVENTION

Accordingly, it is a general object of the present invention to provide a novel and useful prestaging method, buffer management method and file system, in which the problems described above are eliminated.

Another and more specific object of the present invention is to provide a prestaging method adapted to a computer system comprising a central processing unit, buffer means and a secondary storage, where the prestaging method reads input data of a submitted job into the buffer means from the secondary storage before executing the submitted job so as to carry out a prestaging and comprises the steps of (a) obtaining a number of jobs for which prestagings are to be carried out simultaneously as the prestaging for the submitted job, (b) obtaining an effective data transfer speed based on the number of jobs and a data transfer speed of the secondary storage which stores the input data of the submitted job for which the prestaging is to be carried out, and (c) setting a prestaging start time from which the prestaging for the submitted job is to start by subtracting an effective data transfer time from a scheduled job start time from which the submitted job is to start, the effective data transfer time being defined as a time which is obtained by dividing an amount of the input data by the effective data transfer speed. According to the prestaging method of the present invention, it is possible to determine the prestaging start time which is close to an optimum prestaging start time by taking into consideration the number of jobs for which the prestagings are to be carried out simultaneously. Hence, it is possible to improve both the job execution performance and the performance of the computer system as a whole.

Still another object of the present invention is to provide a prestaging method adapted to a computer system comprising a central processing unit, buffer means and a secondary storage, where the prestaging method reads input data of a submitted job into the buffer means from the secondary storage before executing the submitted job so as to carry out a prestaging and comprises the steps of (a) investigating a load of a data transfer path from the secondary storage to the buffer means at a time when the job is submitted, (b) obtaining an effective data transfer speed by subtracting the load of the data transfer path from a data transfer speed of the secondary storage which stores the input data of the submitted job for which the prestaging is to be carried out, and (c) setting a prestaging start time from which the prestaging for the submitted job is to start by subtracting an effective data transfer time from a scheduled job start time from which the submitted job is to start, where the effective data transfer time is defined as a time which is obtained by dividing an amount of the input data by the effective data transfer speed. According to the prestaging method of the present invention, it is possible to determine the prestaging start time which is close to an optimum prestaging start time by taking into consideration the load of the data transfer path at the time when the job is submitted. Hence, it is possible to improve both the job execution performance and the performance of the computer system as a whole.

A further object of the present invention is to provide a prestaging method adapted to a computer system comprising a central processing unit, buffer means and a secondary storage, where the prestaging method reads input data of a submitted job into the buffer means from the secondary storage before executing the submitted job so as to carry out a prestaging and comprises the steps of (a) predicting a load of a data transfer path from the secondary storage to the buffer means at a time when the prestaging is carried out for the submitted job, (b) obtaining a predicted data transfer speed by subtracting the predicted load of the data transfer path from a data transfer speed of the secondary storage which stores the input data of the submitted job for which the prestaging is to be carried out, and (c) setting a prestaging start time from which the prestaging for the submitted job is to start by subtracting a predicted data transfer time from a scheduled job start time from which the submitted job is to start, where the predicted data transfer time is defined as a time which is obtained by dividing an amount of the input data by the predicted data transfer speed. According to the prestaging method of the present invention, it is possible to determine the prestaging start time which is close to an optimum prestaging start time by predicting the load of the data transfer path at the time when the prestaging is carried out. Hence, it is possible to improve both the job execution performance and the performance of the computer system as a whole.

Another object of the present invention is to provide a prestaging method adapted to a computer system comprising a central processing unit, buffer means and a secondary storage, where the prestaging method reads input data of a submitted job into the buffer means from the secondary storage before executing the submitted job so as to carry out a prestaging and comprises the steps of (a) securing in advance a data transfer path from the secondary storage to the buffer means, which data transfer path is required for carrying out the prestaging, (b) obtaining a reserved data transfer speed based on the secured data transfer path, and (c) setting a prestaging start time from which the prestaging for the submitted job is to start by subtracting a predicted data transfer time from a scheduled job start time from which the submitted job is to start, where the predicted data transfer time is defined as a time which is obtained by dividing an amount of the input data of the submitted job for which the prestaging is to be carried out by the reserved data transfer speed. According to the prestaging method of the present invention, it is possible to determine an optimum prestaging start time based on the data transfer path which is secured in advance. Hence, it is possible to improve both the job execution performance and the performance of the computer system as a whole.

Still another object of the present invention is to provide a prestaging method adapted to a computer system comprising a central processing unit, buffer means and a secondary storage, where the prestaging method reads input data of a submitted job into the buffer means from the secondary storage before executing the submitted job so as to carry out a prestaging and comprises the steps of (a) determining a prestaging start time from which the prestaging for the submitted job is to start, and (b) after determining the prestaging start time, correcting the prestaging start time for a previously submitted job depending on a change in a load of a data transfer path from the secondary storage to the buffer means caused by the submitted job. According to the prestaging method of the present invention, it is possible to set the prestaging start time to a more appropriate time because the prestaging start time with respect to the previously submitted job is corrected by taking into consideration the change in the load of the data transfer path every time a new job is submitted into the computer system. Hence, it is possible to further improve both the job execution performance and the performance of the computer system.

A further object of the present invention is to provide a prestaging method adapted to a computer system comprising a central processing unit, buffer means and a secondary storage, where the prestaging method reads input data of a submitted job into the buffer means from the secondary storage before executing the submitted job so as to carry out a prestaging and comprises the steps of (a) carrying out the prestaging for the submitted job, (b) after carrying out the prestaging for the submitted job, investigating whether or not the prestaging ended on or before a reference time, and (c) carrying out a prestaging again to read specific data into the buffer means from the secondary storage if the prestaging ends on or before the reference time and a data region of the buffer means into which the input data are read is taken over by another job thereby causing take over of the specific data within the data region. According to the prestaging method of the present invention, if the prestaging for the job ends on or before the reference time and the data region within the buffer which reads in the data is taken over by another job, the prestaging is carried out again so as to read the data which are taken over into the secondary storage. For this reason, it is possible to improve the probability of the data existing in the buffer when executing the job. Therefore, it is possible to improve both the job execution performance and the performance of the computer system as a whole.

Another object of the present invention is to provide a buffer management method adapted to a computer system comprising a central processing unit, buffer means and a secondary storage, where the buffer management method manages a buffer region of the buffer means in blocks when making a data transfer between the secondary storage and the buffer means and comprises the steps of (a) preparing at least three kinds of free lists which hold block information related to blocks of the buffer means which are subject to take over by another block, where the three kinds of free lists including a "used list" include block information having a low possibility of being used again, an "unused list" including unused block information and an "in-use list" including block information having a high possibility of being used again, and (b) if the data transfer with respect to a block of the buffer means ends, releasing this block by queuing block information related to this block into one of the free lists selected depending on a state of the buffer means. According to the buffer management method of the present invention, it is possible to carry out an efficient buffer management which suits an application which makes one sequential access to the data. Hence, it is possible to improve both the performance of the application and the performance of the computer system as a whole.

Still another object of the present invention is to provide a file system adapted to a computer system comprising a central processing unit, buffer means and a secondary storage, where the file system makes a data transfer between the secondary storage and the buffer means in blocks and comprises means for preparing at least three kinds of free lists which hold block information related to blocks of the buffer means which are subject to take over by another block, where the three kinds of free lists include a "used list" including block information having a low possibility of being used again, an "unused list" including unused block information and an "in-use list" including block information having a high possibility of being used again, and means for releasing a block of the buffer means by queuing block information related to this block into one of the free lists selected depending on a state of the buffer means if the data transfer with respect to this block of the buffer means ends. According to the file system of the present invention, it is possible to carry out an efficient buffer management which suits an application which makes one sequential access to the data. Hence, it is possible to improve both the performance of the application and the performance of the computer system as a whole.

Other objects and further features of the present invention will be apparent from the following detailed description when read in conjunction with the accompanying drawings.

BRIEF DESCRIPTION OF THE DRAWINGS

FIG. 23 is a diagram for explaining map information which is used in a sixth embodiment of the buffer management method according to the present invention;

DESCRIPTION OF THE PREFERRED EMBODIMENTS

Figure 1:
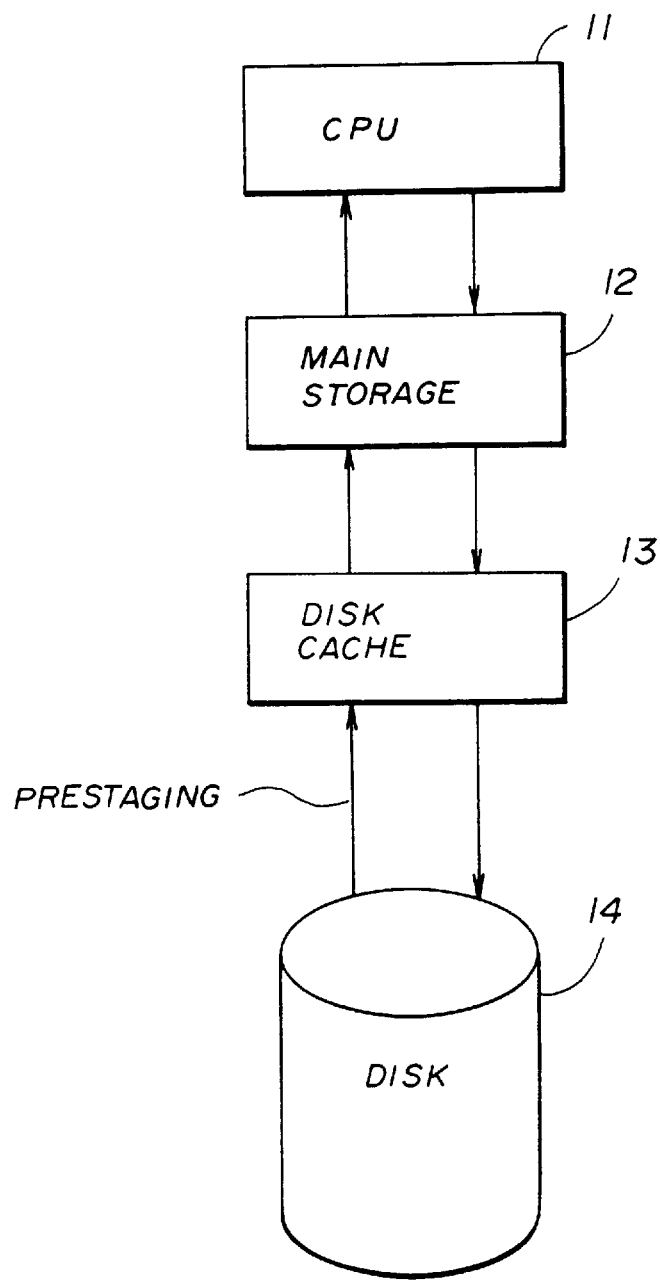
FIG. 1 is a system block diagram showing a computer system.

A computer system to which the present invention may be applied has the same construction as the computer system shown in FIG. 1. In other words, the computer system applied with the present invention includes a central processing unit (CPU) 11, a main storage 12, a disk cache 13 which is used as a secondary storage, and a disk 14 which is used as a secondary storage. Hence, storages having different processing speeds are arranged hierarchically. Data read by a job are read into the disk cache 13 from the disk 14 in advance by carrying out a prestaging before the job execution.

Figure 2:
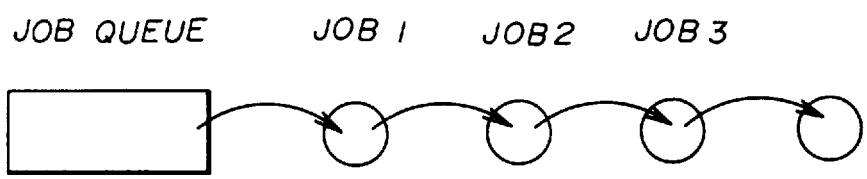
FIG. 2 is a diagram for explaining a job queue and a job execution procedure.
Figure 3:
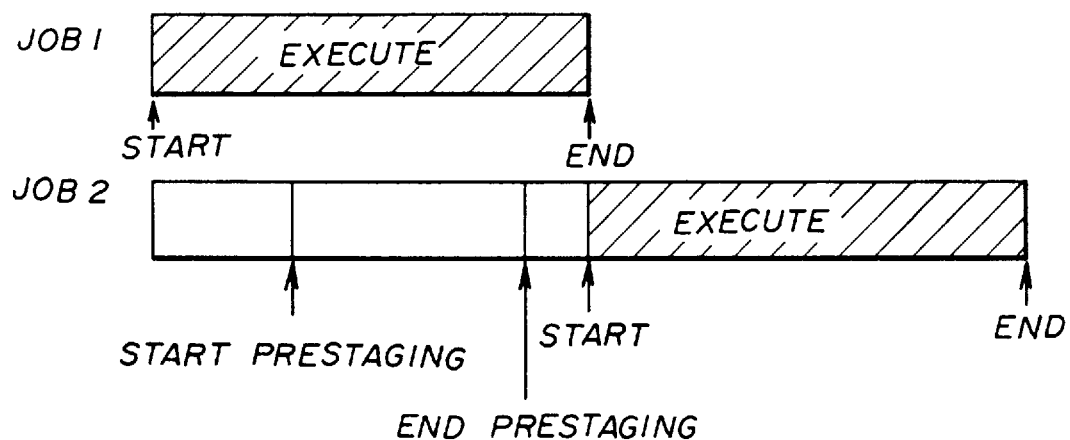
FIG. 3 is a diagram for explaining prestaging and execution of the job.

FIG. 2 is a diagram for explaining a job queue and a job execution procedure, and FIG. 3 is a diagram for explaining prestaging and execution of the job. As shown in FIG. 2, a job which is to be executed is requested by a user of the computer system, and this job is connected to the job queue which is managed by a job management module of the CPU 11. The prestaging start time is determined when connecting the job to the job queue. A plurality of job queues exist, and one job can be executed for each of the job queues. As shown in FIG. 2, the jobs connected to one job queue are executed in sequence which is "job 1", "job 2" and "job 3" in this particular case.

If the scheduled prestaging start time for the job 2 arrives during execution of the preceding job 1 as shown in FIG. 3, the job management module issues a prestaging request with respect to an operating system (OS) of the CPU 11. As a result, the prestaging for the job 2 starts, and the prestaging for the job 2 ends before the execution of the job 2 starts. The execution of the job 2 starts when the execution of the job 1 ends.

Figure 4:
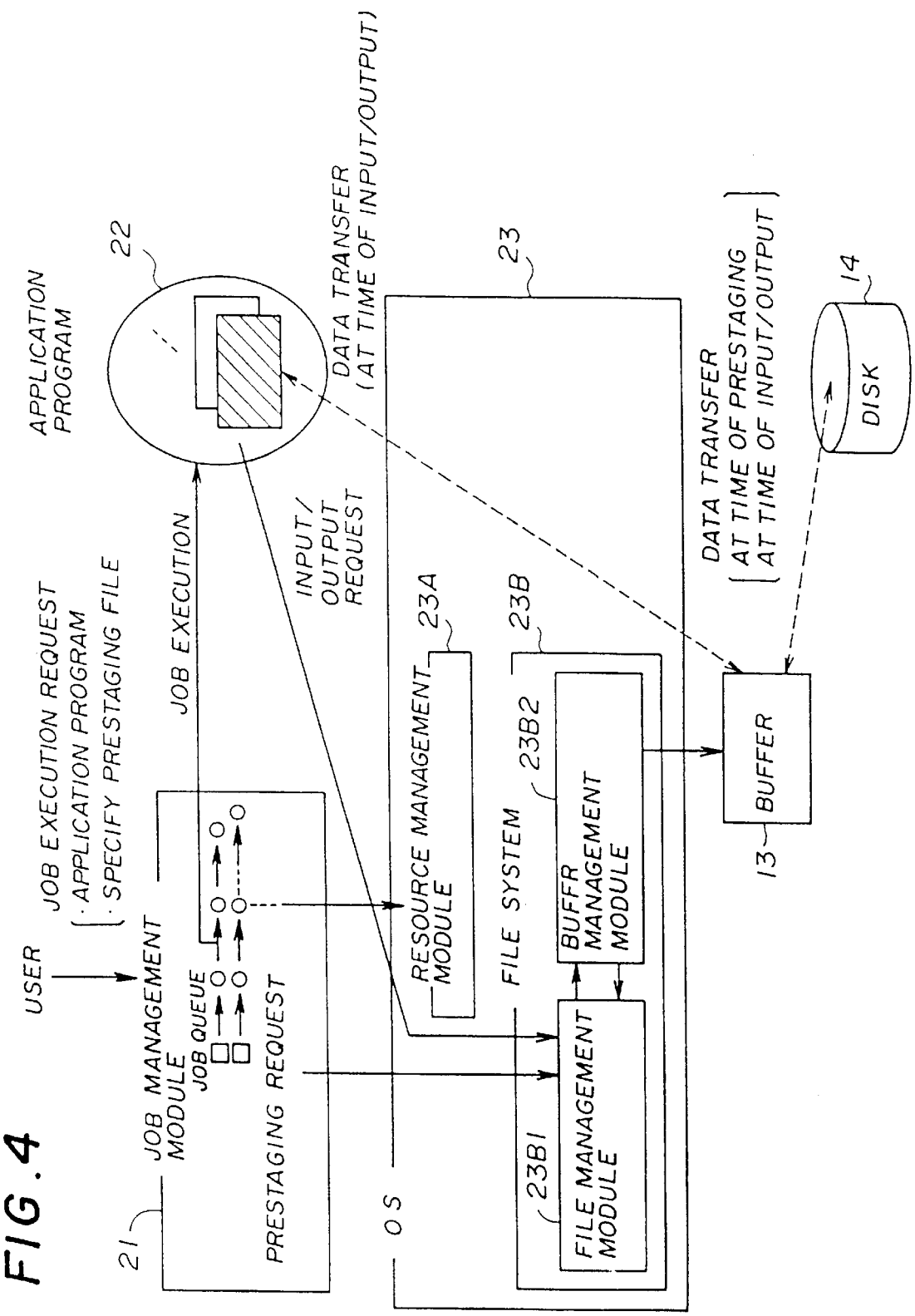
FIG. 4 is a diagram for explaining the relationship between a job management module and an OS.

FIG. 4 is a diagram for explaining the relationship between the job management module and the OS. If the user of the computer system requests execution of a job, this job execution request is managed by a job management module 21 of the CPU 11. This job management module 21 is stored within the main storage 13 together with a plurality of application programs 22 and an operating system 23. The job execution request includes designation of the application program and a prestaging file. The job which is submitted by the job execution request is connected to one of the job queues which are managed by the job management module 21. Information related to the job queue is managed by a resource management module 23A within the OS 23. The execution of each job is requested to the application program 22, and the application program 22 carries out processes such as making a file input/output request with respect to a file management module 23B1 of the OS 23 and transferring data between the application program 22 and a buffer 13. In the latter case, since the buffer 13 corresponds to the disk cache 13 shown in FIG. 1, a data transfer is made between the main storage 12 and the disk cache 13.

On the other hand, the job management module 21 makes a prestaging request for the submitted job with respect to the file management module 23B1 within the OS 23. Accordingly, the OS 23 carries out the prestaging by controlling the data transfer between the buffer 13 and the disk 14 by the file management module 23B1 and a buffer management module 23B2. Together with the buffer management module 23B2, the file management module 23B1 forms a file system 23B which uses a buffer region of the buffer 13. The data transfer between the disk 14 and the buffer 13 is made at the time of the prestaging and at the time of the data input/output.

More particularly, the file management module 23B1 receives a file input/output request from the application program 22, manages a data region peculiar to the program, and makes a data input/output process between the buffer 13 and the disk 14. In addition, the buffer management module 23B2 manages the buffer regions of the buffer 13 used by the file system 23B, and makes buffer region acquisition and release processes in blocks.

Figure 5:
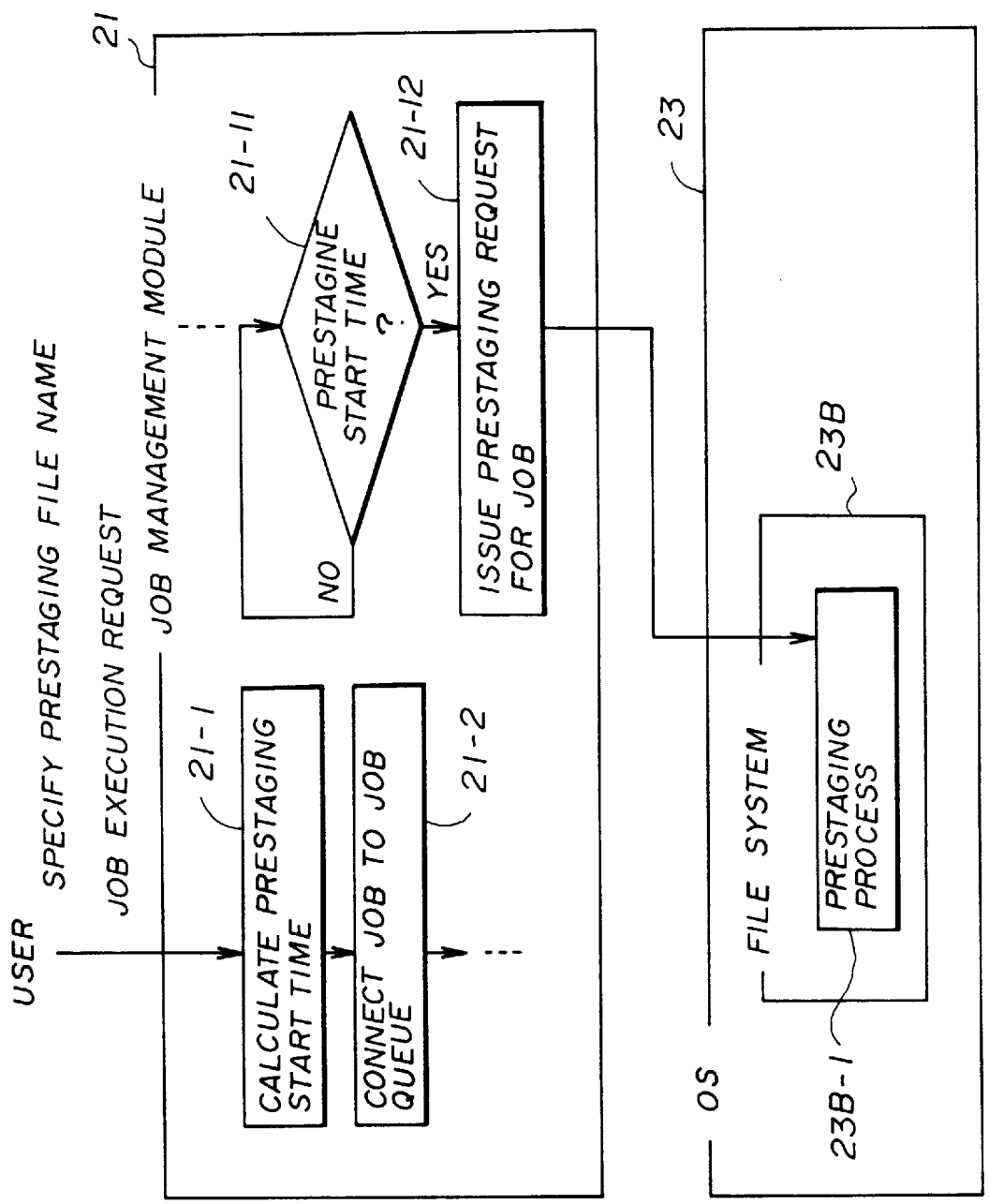
FIG. 5 is a flow chart for explaining the general operations of the job management module and the OS shown in FIG. 4.

FIG. 5 is a flow chart for explaining the general operations of the job management module 21 and the OS 23. The job management module 21 calculates a prestaging start time in a step 21-1 when there is a job execution request from the user of the computer system. A step 21-2 connects the job submitted by the job execution request to one of the job queues which are managed by the job management module 21. On the other hand, a step 21-11 decides whether or not the prestaging start time has arrived. When the decision result in the step 21-11 becomes YES, a step 21-12 issues a prestaging request for the above job with respect to the OS 23. In the file system 23B of the OS 23, a step 23B-1 carries out the prestaging process in response to this prestaging request.

Figure 6:
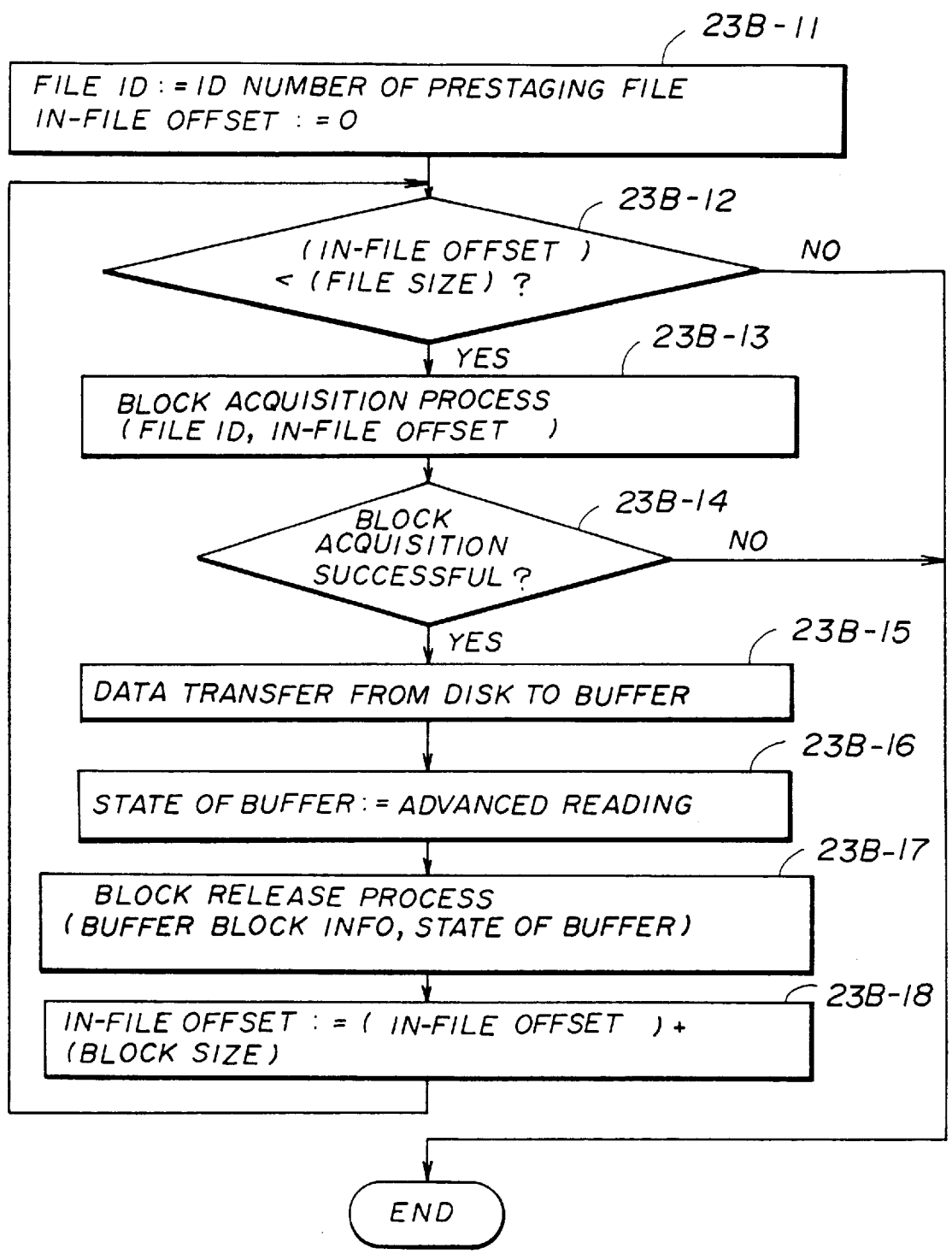
FIG. 6 is a flow chart generally showing a process carried out by a step 23B-1 in FIG. 5.

FIG. 6 is a flow chart generally showing the process which is carried out by the step 23B-1. A step 23B-11 sets a file identification (ID) number as an ID number of the prestaging file, and also sets a position within the file (hereinafter simply referred to as an "in-file offset") to "0". A step 23B-12 decides whether or not the in-file offset is smaller than the file size, and the process ends if the decision result is NO. If the decision result of the step 23B-12 is YES, a step 23B-13 makes a block acquisition process based on the file ID number and the in-file offset. This block acquisition process is made so as to secure a region for transferring the data stored in the disk 14 into the disk cache 13, that is, the buffer 13. A step 23B-14 decides whether or not the block acquisition process of the step 23B-13 was successful, and the process ends if the decision result is NO.

On the other hand, if the decision result of the step 23B-14 is YES, a step 23B-15 transfers the data from the disk 14 to the disk cache 13, that is, the buffer 13. A step 23B-16 reads the state of the buffer 13 in advance, and a step 23B-17 makes a block release process based on information related to the acquired block and the state of the buffer 13 obtained in the step 23B-16. By carrying out this block release process, the acquired block within the buffer 13 is released. Furthermore, a step 23B-18 updates the in-file offset by increasing the position by an amount corresponding to the size of the block. After the step 23B-18, the process returns to the step 23B-12.

A more detailed description related to the block acquisition process and the block release process will be given later on in the specification.

Figure 7:
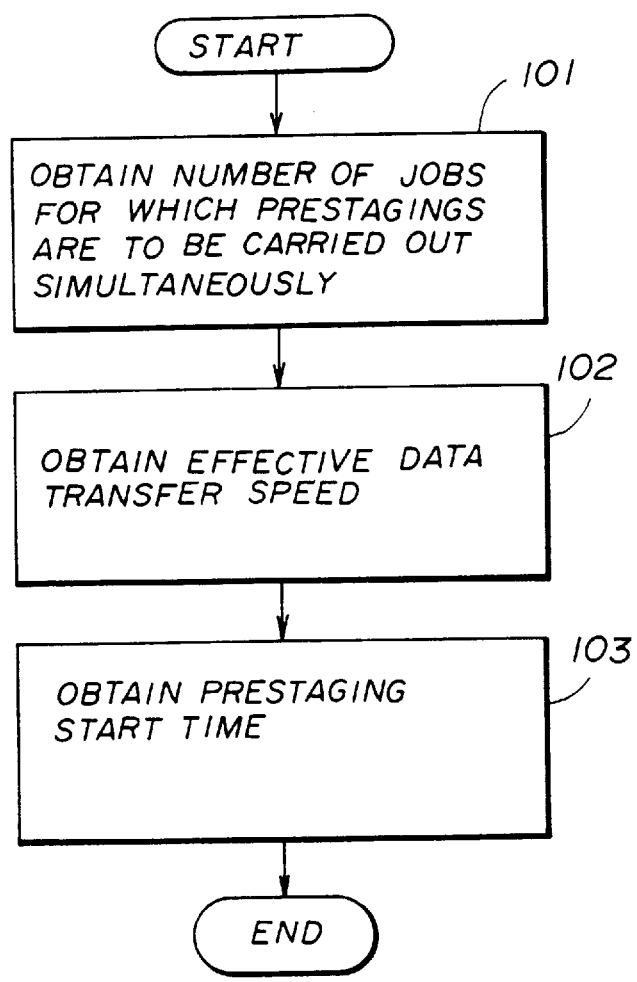
FIG. 7 is a flow chart showing a processing procedure of a first embodiment of a prestaging method according to the present invention.

Next, a description will be given of the processing procedure of a first embodiment of the prestaging method according to the present invention, by referring to a flow chart of FIG. 7. At the time when the job is submitted into the computer system after the user of the computer system makes the job execution request, the job management module 21 investigates all of the job queues in a step 101 and searches for jobs which are executed at the same time as the submitted job. A number n of jobs which are to be executed at the same time, which is found as a result of the search, corresponds to the number of jobs for which the prestagings are to be carried out simultaneously.

Then, an effective data transfer speed is obtained in a step 102 based on the following formula (1)

(Effective Data Transfer Speed)=$f$(Transfer Speed of Disk, $n$)  (1)

In the formula (1) above, a function f is the function for obtaining the effective data transfer speed of the job based on the data transfer speed of the disk 14 which stores the input data of the job for which the prestaging is to be carried out and based on the number n of jobs for which the prestagings are to be carried out simultaneously. When simultaneously carrying out the prestagings for a plurality of jobs, the data are read from one disk 14, and the data transfer speed for each job becomes slower than the data transfer speed of the disk 14 itself. An effective data transfer speed which is extremely close to the data transfer speed at the time of actually carrying out the prestaging can be obtained from this function f.

Next, a prestaging start time $t_{PS}$ is obtained in a step 103 based on the following formula (2).

$t_{PS}=t_{JS}-$(Amount of Input Data)/(Effective Data Transfer Speed)(2)

In the formula (2) above, a value which is obtained by dividing the amount of input data of the job by the effective data transfer speed obtained from the function f becomes an effective data transfer time. The prestaging start time $t_{PS}$ is determined as the time which is obtained by subtracting this effective data transfer time from the job start time $t_{JS}$.

In this embodiment, the effective data transfer speed is obtained by taking into consideration the number n of jobs for which the prestagings are to be carried out simultaneously. And, the prestaging start time is determined based on this effective data transfer speed so that the prestaging ends immediately before the execution of the job starts. For this reason, it is possible to obtain a prestaging start time which is extremely close to an optimum prestaging start time.

Accordingly, when executing the job, the data can be read from the disk cache 13 at a high speed, thereby making it possible to improve the job execution performance. In addition, because the prestaging will not be completed considerably before the execution of the job starts, it is possible to prevent the data region used by the prestaging from being taken over by another job before the job starts and to thereby prevent the job execution performance from deteriorating.

Furthermore, the job before being executed will not occupy a region of the disk cache 13 for a useless time, and thus will not deteriorate the execution performance of other jobs. Hence, it is possible to improve the performance of the computer system as a whole.

Figure 8:
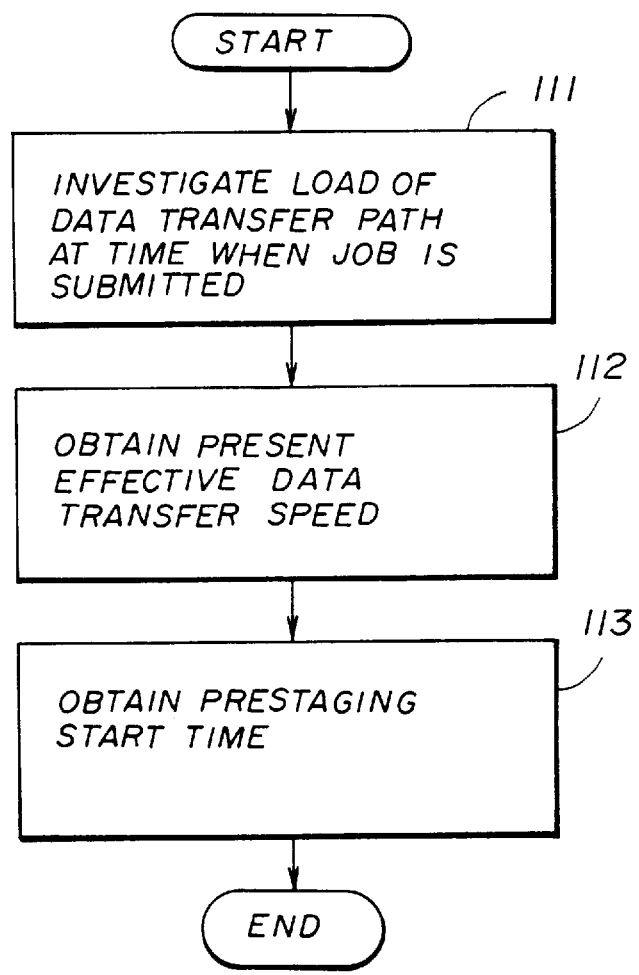
FIG. 8 is a flow chart showing the processing procedure of a second embodiment of the prestaging method according to the present invention.

FIG. 8 is a flow chart showing the processing procedure of a second embodiment of the prestaging method according to the present invention. At the time when the job is submitted into the computer system after the user of the computer system makes the job execution request, the job management module 21 investigates the load of a data transfer path between the disk 14 and the disk cache 13 at this point in time in a step 111. Then, a present effective data transfer speed is obtained in a step 112 based on the following formula (3).

(Present Effective Data Transfer Speed)=(Data Transfer Speed of Disk 14)−(Load of Present Data Transfer Path)    (3)

As may be seen from the formula (3) above, the present effective data transfer speed is the value which is obtained by subtracting the load of the present data transfer path from the data transfer speed of the disk 14. The load of the data transfer path is not always constant, and changes dynamically depending on the execution conditions of the input/output process of the job at each point in time. However, this embodiment investigates the load of the data transfer path at the time when the job is submitted into the computer system. For this reason, it is possible to obtain a present effective data transfer speed which is extremely close to the data transfer speed at the time when the prestaging is carried out.

For example, the following method may be employed as the method of investigating the load of the data transfer path at the time when the job is submitted into the computer system. In other words, the data input/output between the disk cache 13 and the disk 14 is made via a specific disk driver (not shown). Hence, it is possible to know the load of the present data transfer path by investigating the queue of the input/output requests held by the disk driver.

Next, a prestaging start time $t_{PS}$ is obtained in a step 113 based on the following formula (4).

$t_{PS}=t_{JS}-$(Amount of Input Data)/(Present Effective Data Transfer Speed)    (4)

In the formula (4), the effective data transfer time is the value which is obtained by dividing the amount of input data of the job by the effective data transfer speed. The prestaging start time $t_{PS}$ is determined to the time which is obtained by subtracting this effective data transfer time from the job start time $t_{JS}$.

In this embodiment, the present effective data transfer speed is obtained by investigating the load of the data transfer path at the time when the job is submitted into the computer system, and the prestaging start time is determined based on the present effective data transfer speed so that the prestaging ends immediately before the execution of the job starts. Therefore, it is possible to obtain a prestaging start time which is extremely close to an optimum prestaging start time.

Accordingly, when executing the job, it is possible to read the data from the disk cache 13 at a high speed and hence improve the job execution performance. In addition, since the prestaging will not be completed considerably before the job execution start time, it is possible to prevent the data region used by the prestaging from being taken over by another job before the job starts and to thereby prevent the job execution performance from deteriorating.

Furthermore, the job before being executed will not occupy a region of the disk cache 13 for a useless time, and thus will not deteriorate the execution performance of other jobs. Hence, it is possible to improve the performance of the computer system as a whole.

Figure 9:
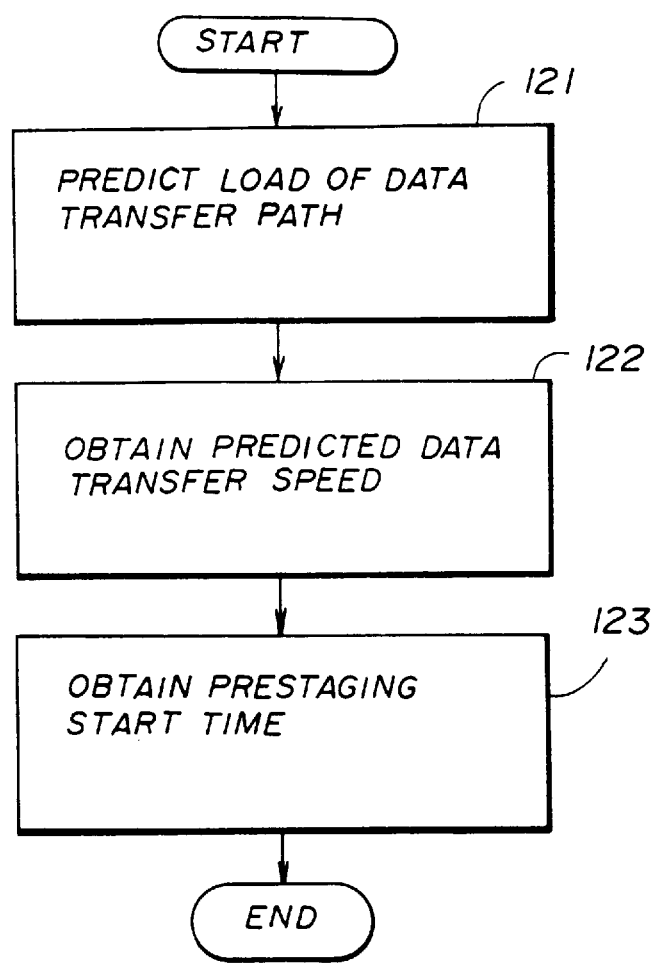
FIG. 9 is a flow chart showing the processing procedure of a third embodiment of the prestaging method according o the present invention.

FIG. 9 is a flow chart showing the processing procedure of a third embodiment of the prestaging method according to the present invention. At the time when the job is submitted into the computer system after the user of the computer system makes the job execution request, the job management module 21 investigates all of the job queues and predicts the load of the data transfer path at the time when the prestaging is carried out for the submitted job in a step 121. In addition, the step 121 searches for jobs which are executed at the same time as the submitted job, and predicts the load of the data transfer path by obtaining the sum total of the amounts of input data of the jobs which are found as a result of the search. Then, a predicted data transfer speed is obtained in a step 122 based on the following formula (5).

(Predicted Data Transfer Speed)=(Data Transfer Speed of Disk 14)−(Load of Predicted Data Transfer Path)    (5)

As may be seen from the formula (5) above, the value obtained by subtracting the load of the predicted data transfer path from the data transfer speed of the disk 14 becomes the predicted data transfer speed. The load of the data transfer path is not always constant, and changes dynamically depending on the execution conditions of the input/output process of the job at each point in time. However, this embodiment predicts the load of the data transfer path at the time when the job is executed. For this reason, it is possible to obtain a predicted data transfer speed which is extremely close to the data transfer speed at the time when the prestaging is carried out.

For example, the following method can be employed as a method of predicting the load of the data transfer path. That is, all of the jobs of the job queue managed by the job management module 21 are searched, and the data transfer speed at the time when the prestaging is carried out is obtained for each job based on the prestaging start time, the job start time and the amount of data transfer. The data transfer speed is obtained by dividing the amount of data transfer by the value which is obtained by subtracting the prestaging start time from the job start time. By making a table such as that shown in FIG. 10 based on the data transfer speed which is obtained in the above described manner, it is possible to predict from the table the load of the data transfer path at each point in time. In other words, the load of the data transfer path at a certain point in time is the sum total of the data transfer speeds of the prestagings which are being carried out at that certain point in time.

Figure 10:
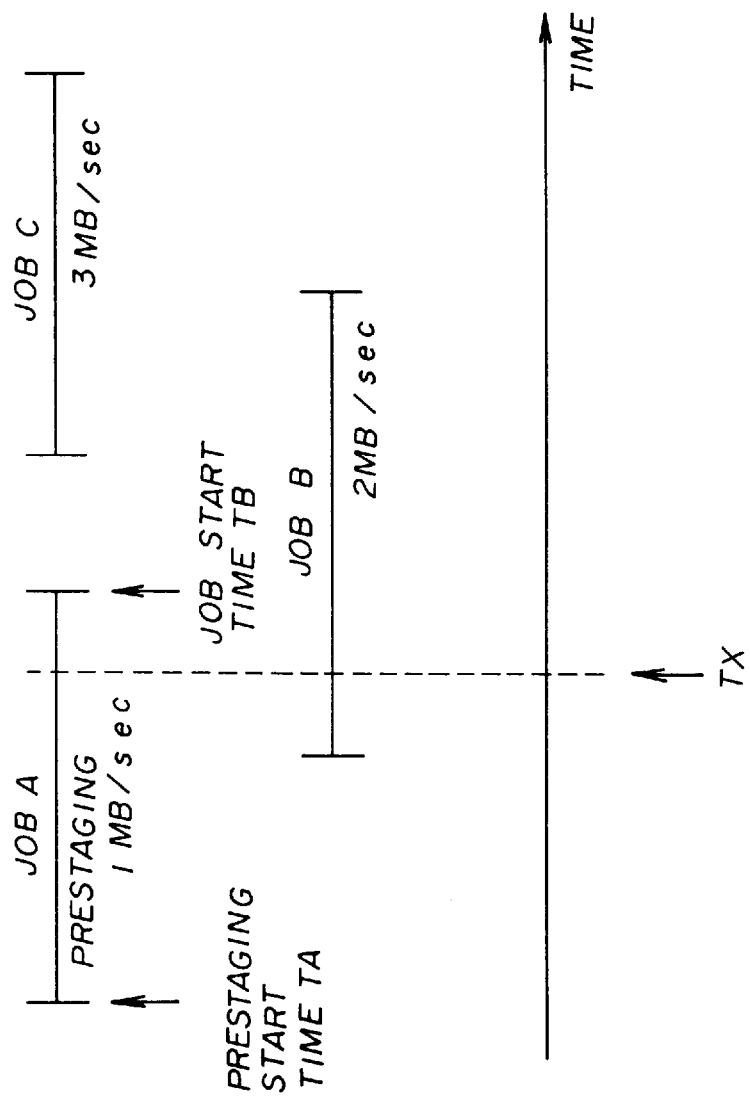
FIG. 10 is a diagram for explaining a method of predicting a load of a data transfer path.

In the case shown in FIG. 10, the prestaging for a job A is carried out at 1 Mbytes/sec, and this prestaging starts at a prestaging start time TA. The job A starts at a job start time TB. On the other hand, the prestaging for a job B is carried out at 2 Mbytes/sec, and the prestaging for a job C is carried out at 3 Mbytes/sec. In this particular case, the load of the data transfer path at a time TX is 3 Mbytes/sec.

Next, a prestaging start time $t_{PS}$ is obtained in a step 123 based on the following formula (6).

$t_{PS}=t_{JS}-$(Amount of Input Data)/(Predicted Data Transfer Speed)    (6)

In the formula (6) above, a value which is obtained by dividing the amount of input data by the predicted data transfer speed becomes the predicted data transfer time. The prestaging start time $t_{PS}$ is determined as the time which is obtained by subtracting this predicted data transfer time from the job start time $t_{JS}$.

In this embodiment, the load of the data transfer path at the time when the prestaging is carried out is predicted at the time when the job is submitted into the computer system, and the predicted data transfer speed at the time when the prestaging is carried out is obtained. The prestaging start time is determined based on the predicted data transfer speed, so that the prestaging ends immediately before the execution of the job starts. Hence, it is possible to obtain a prestaging start time which is extremely close to an optimum prestaging start time.

Therefore, when executing the job, it is possible to read the data from the disk cache 13 at a high speed and hence improve the job execution performance. In addition, since the prestaging will not be completed considerably before the job execution start time, it is possible to prevent the data region used by the prestaging from being taken over by another job before the job starts and to thereby prevent the job execution performance from deteriorating.

Furthermore, the job before being executed will not occupy a region of the disk cache 13 for a useless time, and thus will not deteriorate the execution performance of other jobs. Hence, it is possible to improve the performance of the computer system as a whole.

Figure 11:
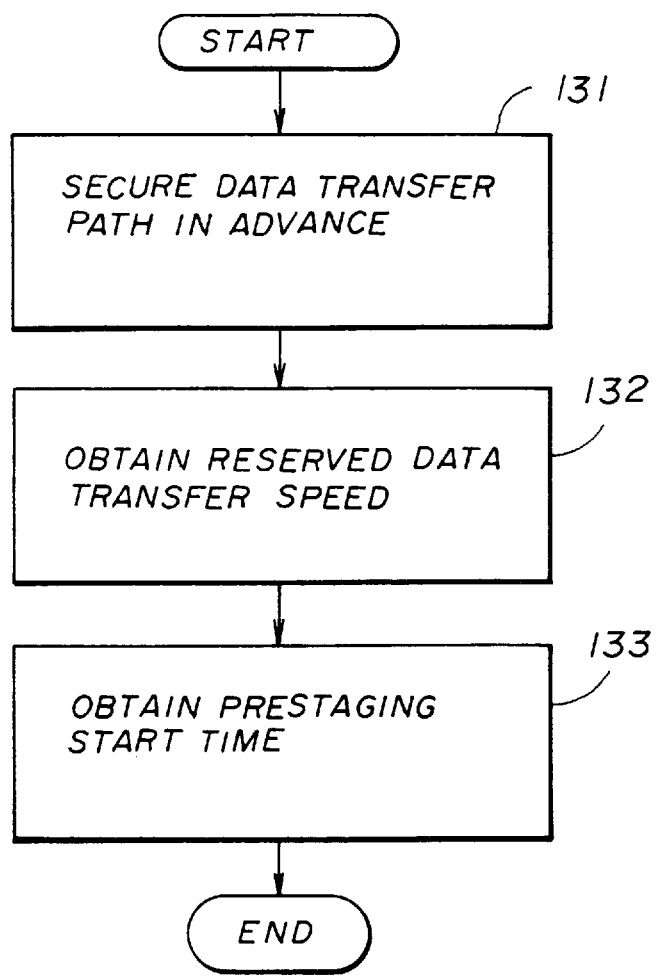
FIG. 11 is a flow chart showing the processing procedure of a fourth embodiment of the prestaging method according to the present invention.
Figure 12:
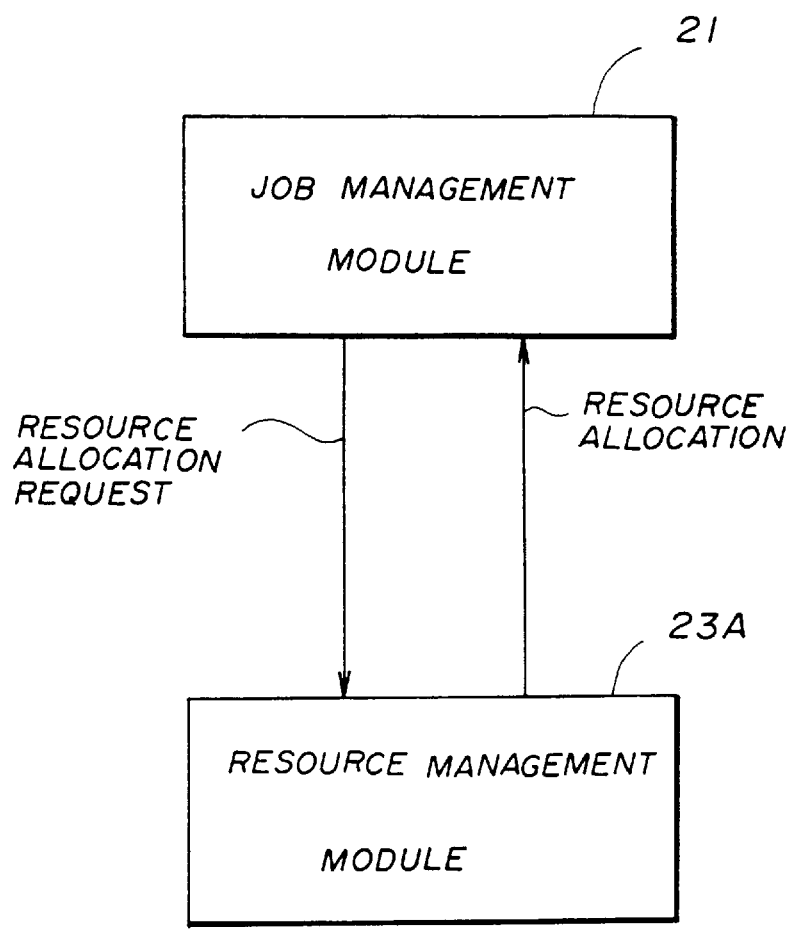
FIG. 12 is a diagram for explaining a resource allocation in the fourth embodiment of the prestaging method according to the present invention.

FIG. 11 is a flow chart showing the processing procedure of a fourth embodiment of the prestaging method according to the present invention, and FIG. 12 is a diagram for explaining a resource allocation in this embodiment. At the time when the job is submitted into the computer system after the user of the computer system makes the job execution request, the job management module 21 requests with respect to a resource management module 23A a resource which is required when carrying out the prestaging, that is, allocation of the data transfer path, as shown in FIG. 12.

The resource management module 23A investigates whether or not the requested data transfer path can be allocated, and determines the data transfer path to be allocated. In addition, the resource management module 23A notifies the job management module 21 of information which is related to the allocated data transfer path. The job management module 21 receives the notification information in a step 131 as shown in FIG. 11, and secures the data transfer path.

Next, a predicted data transfer speed is obtained in a step 132 based on the secured data transfer path. In this embodiment, since the data transfer path at the time when the prestaging is carried out is reserved, the data transfer speed at the time when the prestaging is carried out is guaranteed as a predicted data transfer speed. Thereafter, a prestaging start time $t_{PS}$ is obtained in a step 133 based on the following formula (7).

$$t_{PS}=t_{JS}-(\text{Amount of Input Data})/(\text{Predicted Data Transfer Speed}) \qquad (7)$$

In the formula (7) above, a value which is obtained by dividing the amount of input data of the job by the predicted data transfer speed becomes the predicted data transfer time. The prestaging start time $t_{PS}$ is determined as the time which is obtained by subtracting this predicted data transfer time from the job start time $t_{JS}$.

In this embodiment, the predicted data transfer speed at the time when the prestaging is carried out is obtained by securing the data transfer path at the time when the prestaging is carried out by reservation, at the time when the job is submitted into the computer system. The prestaging start time is determined based on this guaranteed predicted data transfer time, so that the prestaging will end immediately before the execution of the job starts. Thus, it is possible to obtain an optimum prestaging start time.

Therefore, when executing the job, it is possible to read the data from the disk cache 13 at a high speed and hence improve the job execution performance. In addition, since the prestaging will not be completed considerably before the job execution start time, it is possible to prevent the data region used by the prestaging from being taken over by another job before the job starts and to thereby prevent the job execution performance from deteriorating.

Furthermore, the job before being executed will not occupy a region of the disk cache 13 for a useless time, and thus will not deteriorate the execution performance of other jobs. Hence, it is possible to improve the performance of the computer system as a whole.

Figure 13:
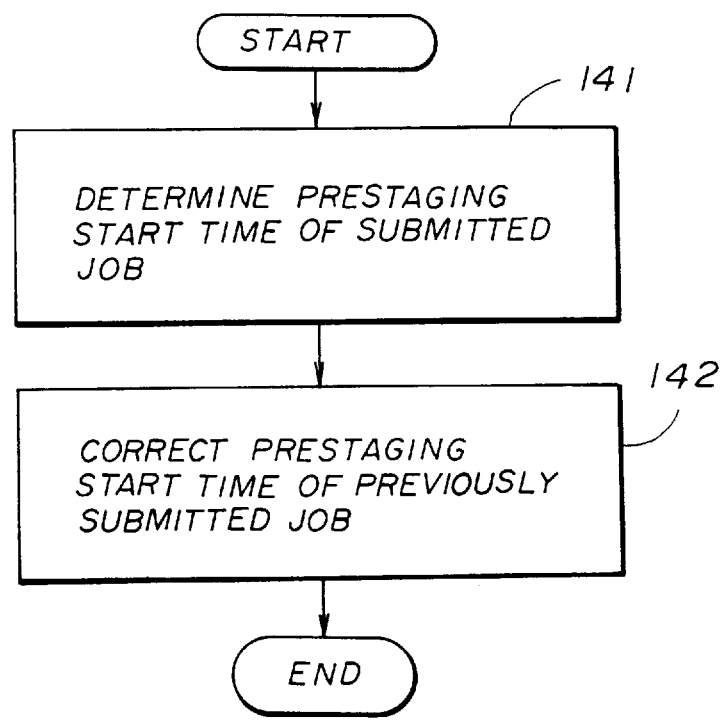
FIG. 13 is a flow chart showing the processing procedure of a fifth embodiment of the prestaging method according to the present invention.

FIG. 13 is a flow chart showing the processing procedure of a fifth embodiment of the prestaging method according to the present invention. At the time when a new job is submitted into the computer system, the job management module 21 determines the prestaging start time of the newly submitted job in a step 141, as shown in FIG. 13. This prestaging start time can be obtained by the method used to obtain the prestaging start time in any of the first through third embodiments of the prestaging method according to the present invention described above.

Next, by taking into consideration the effects of the newly submitted job on the load of the data transfer path, the prestaging start time of the previously submitted job is corrected in a step 142.

Hence, compared to the method which determines the prestaging start time at the time when the job is submitted and keeps this prestaging start time fixed, this embodiment can determine a more appropriate prestaging start time. Accordingly, it is possible to improve the job execution performance and the performance of the computer system as a whole.

Figure 14:
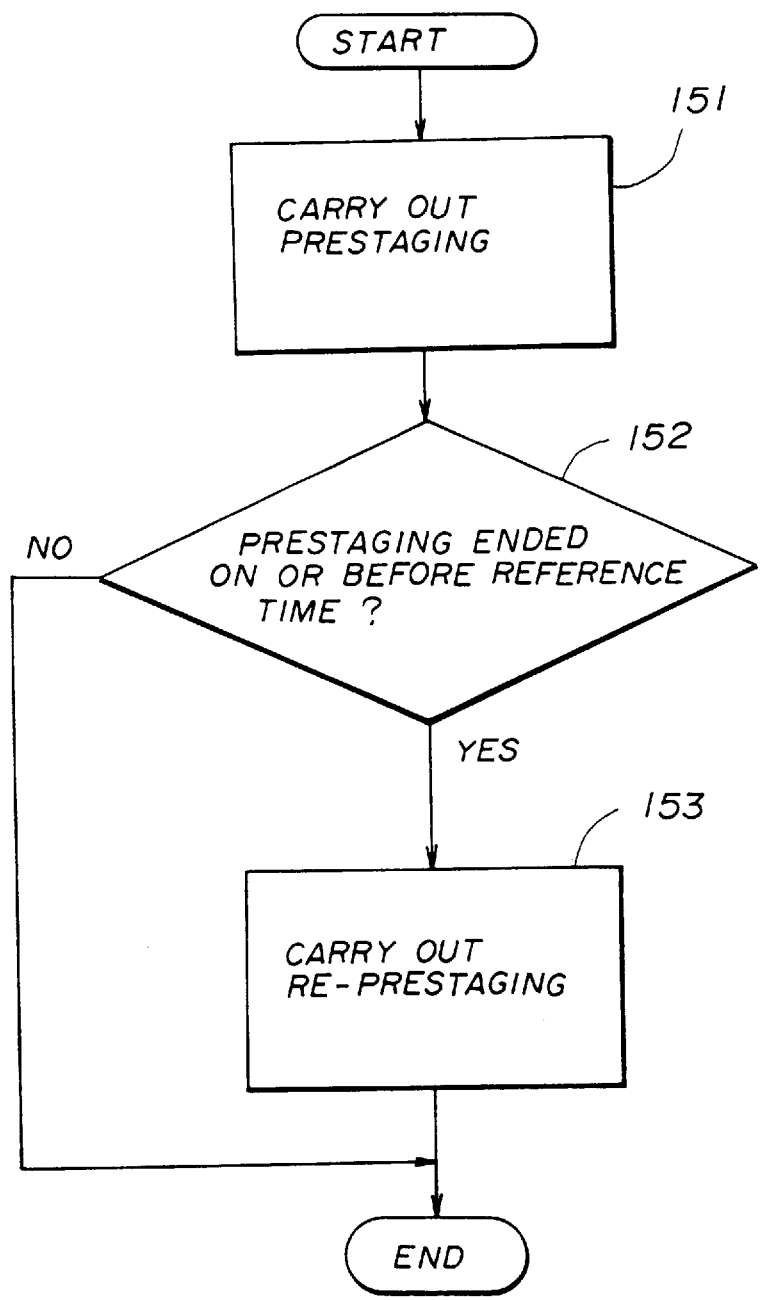
FIG. 14 is a flow chart showing the processing procedure of a sixth embodiment of the prestaging method according to the present invention.

FIG. 14 is a flow chart showing the processing procedure of a sixth embodiment of the prestaging method according to the present invention. In this embodiment, when the prestaging for a job ends in a step 151, a step 152 decides whether or not the prestaging ended at or before a reference time which is a predetermined time before the time when the execution of the job starts. If the prestaging ended after the reference time and the decision result in the step 152 is NO, there is no need to carry out the prestaging again, and the process ends.

On the other hand, if the prestaging ended at or before the reference time and the decision result in the step 152 is YES, the process advances to a step 153. The step 153 investigates whether or not a data region within the disk cache 13 to which the data are read in after the predetermined time elapses from the time when the prestaging ended is taken over by another job. As a result, if the data region within the disk cache 13 is taken over by another job, the step 153 carries out a re-prestaging, so as to read again into the disk cache 13 the data which were erased when the data region was taken over.

Figure 15:
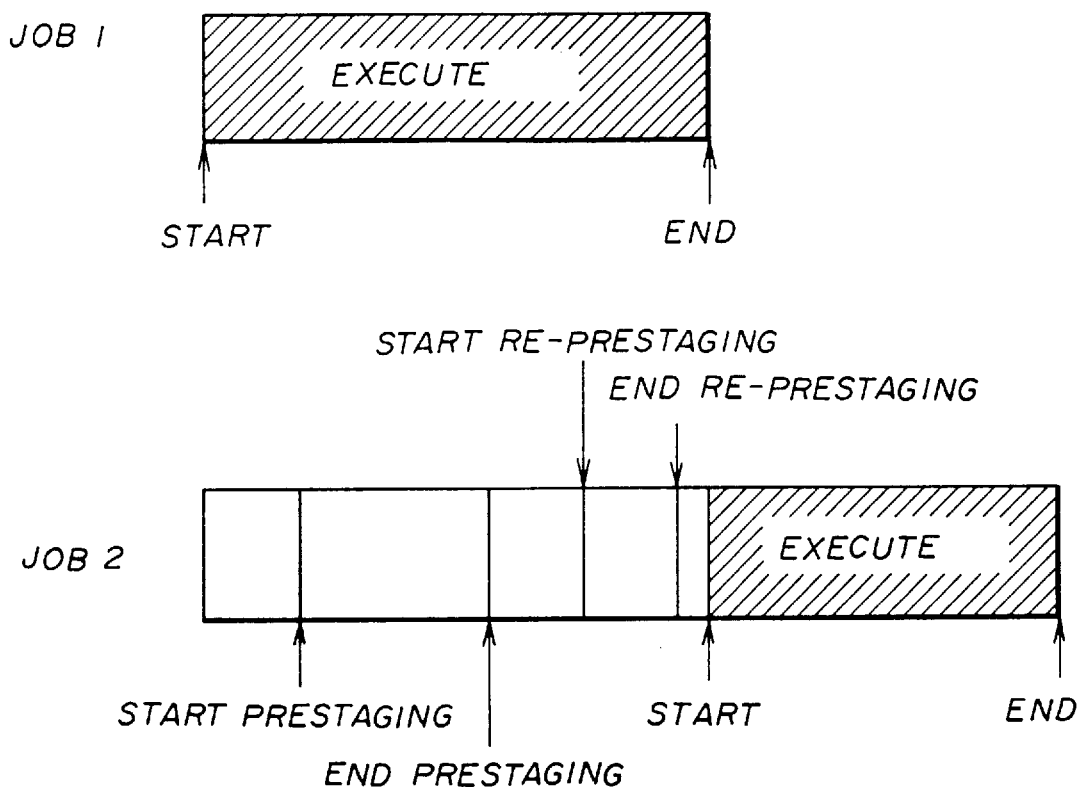
FIG. 15 is a diagram for explaining a re-prestaging in the sixth embodiment of the prestaging method according to the present invention.

The re-prestaging will now be described with reference to FIG. 15. FIG. 15 shows a case where the prestaging for the job 2 has ended considerably before the execution start time of the job 2, and the data region of the disk cache 13 into which the data were read in is erased by being taken over by another job. In FIG. 15, the re-prestaging is carried out after a predetermined elapses from the time when the first prestaging ended, so as to again read in the data which were erased.

According to this embodiment, if the prestaging for a job ends considerably before the execution start time of the job and the data region of the disk cache 13 into which the data are read in is taken over by another job and erased, the prestaging is carried out again, that is, the re-prestaging, is carried out to read in the data which were erased. For this reason, it is possible to improve the probability of the data existing within the disk cache 13 when the job is executed, and improve the job execution performance and the performance of the computer system as a whole.

Figure 16:
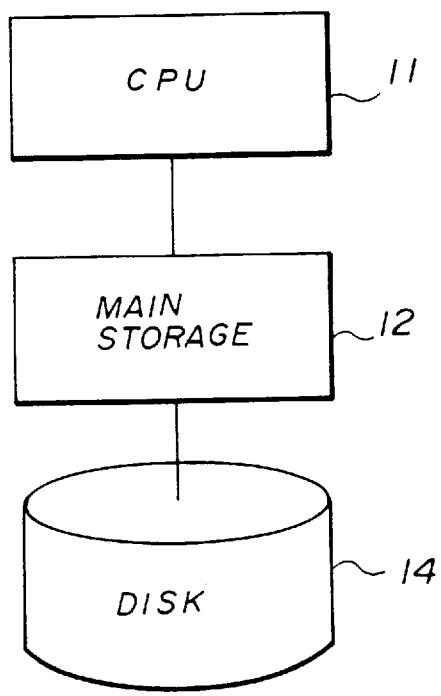
FIG. 16 is a system block diagram showing a computer system.

In each of the embodiments of the prestaging methods described heretofore, the present invention is applied to the computer system shown in FIG. 1. However, prestaging method according to the present invention is similarly applicable to a computer system shown in FIG. 16, for example. In FIG. 16, the computer system includes a CPU 11, a main storage 12 and a disk 14. The main storage 12 is also used as a buffer for the disk 14 which is used as a secondary storage.

Figure 17:
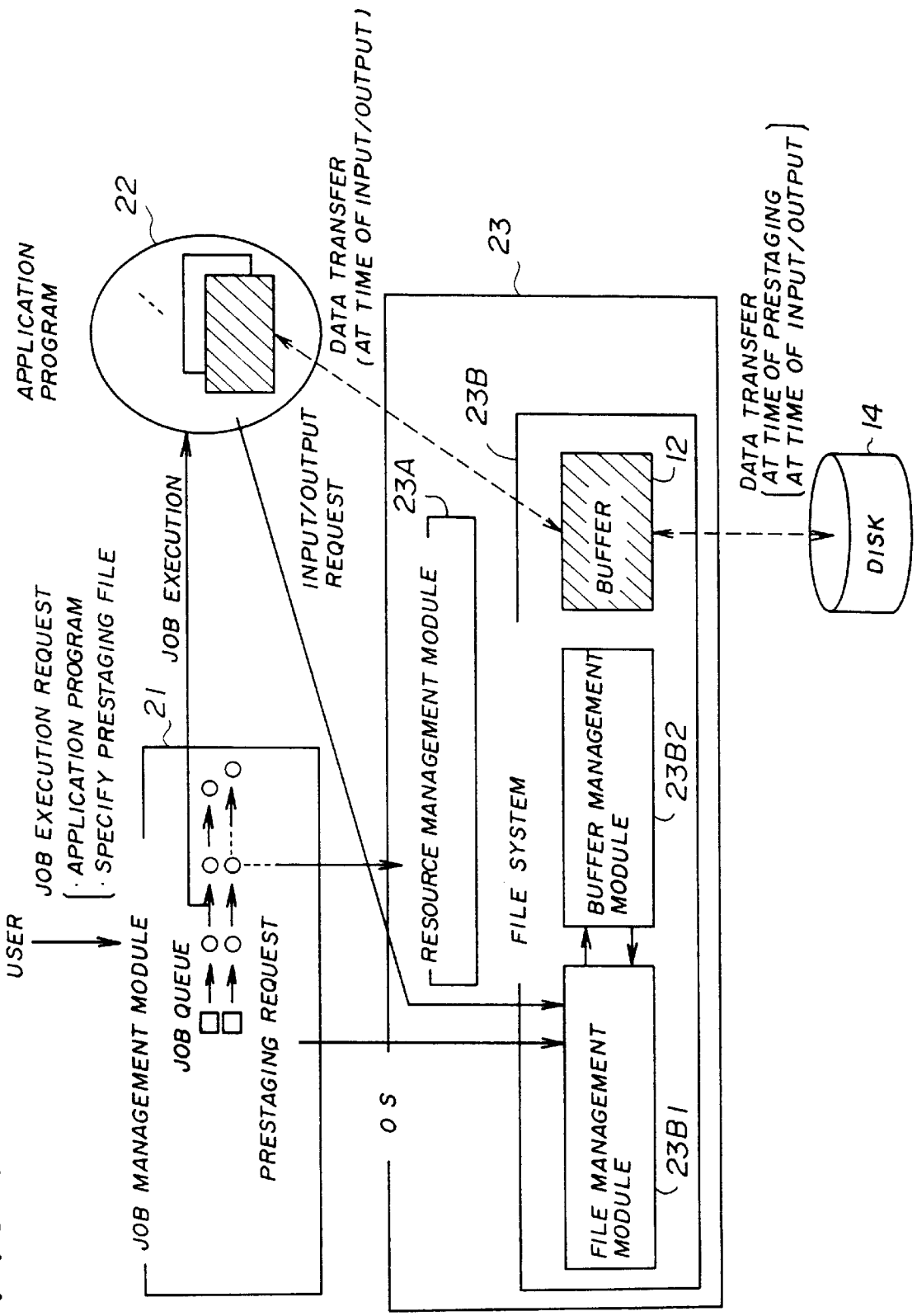
FIG. 17 is a diagram for explaining the relationship between the job management module and the OS.

In the case of the computer system shown in FIG. 16. the relationship between the job management module and the OS becomes as shown in FIG. 17. In FIG. 17, those parts which are the same as those corresponding parts in FIG. 4 are designated by the same reference numerals, and a description thereof will be omitted. In FIG. 17, a buffer 12 which corresponds to the main storage 12 is included within the file system 23B within the OS 23. Otherwise, the relationship shown in FIG. 17 is essentially the same as that shown in FIG. 4.

In the computer system, the buffer is normally divided into blocks having a fixed length, and the allocation of the buffer region is made in blocks. In addition, the buffer region is managed by employing a least recently used (LRU) algorithm, so as to efficiently utilize the buffer region with respect to arbitrary file input/output patterns such as sequential access and random access. The LRU algorithm is a kind of block replacement algorithm. According to the LRU algorithm, the released blocks within the buffer are queued into one free list in sequence from the oldest used block. It is regarded that the possibility of using again the block which was most recently used is high, and the blocks are taken over in sequence starting from the oldest used block. However, in the case of a pattern which makes one sequential access to the file of numerical calculation, image processing or the like, there is virtually no possibility of making access again to the data with respect to which an access has already been made once. Hence, the queuing sequence to the free list is inappropriate in this case, and other useful blocks will be taken over. For this reason, if the LRU algorithm is employed in the computer system which mainly carries out applications related to numerical calculation, image processing or the like, the buffer region will not be utilized efficiently, and there is a problem in that the data input/output performance cannot be improved.

Hence, a description will hereunder be given of embodiments of a buffer management method which can improve the performance of each application and improve the performance of the computer system as a whole, by rearranging the blocks depending on the pattern which makes one sequential access to the file. Of course, the embodiments of the buffer management method are applicable to each of the embodiments of the prestaging method described above. In addition, a file system according to the present invention employs the buffer management method described hereunder. For the sake of convenience, it will be assumed that the buffer management method is applied to the computer system described in conjunction with FIGS. 16 and 17.

Figure 18:
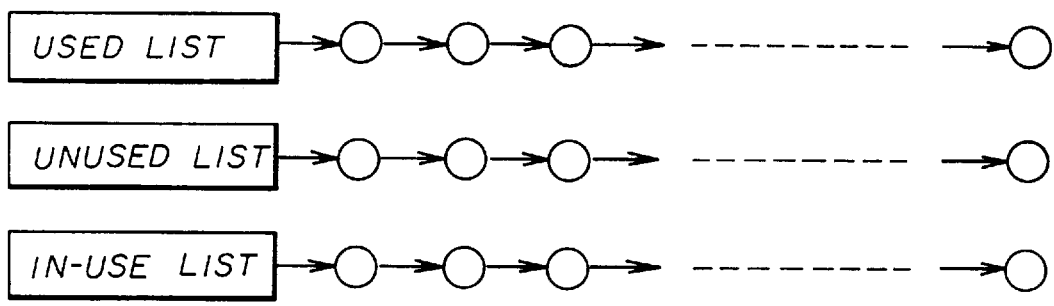
FIG. 18 is a diagram for explaining a first embodiment of a buffer management method according to the present invention.

First, a description will be given of a first embodiment of the buffer management method according to the present invention, by referring to FIG. 18. In this embodiment, when newly allocating a block within the buffer 12, three kinds of free lists are prepared for holding block information which is related to the blocks which are taken over. As shown in FIG. 18, the three kinds of free lists include a "used list", an "unused list" and an "in-use list". In FIG. 18, each circular mark indicates the block information.

The "used list" holds the block information related to the block which has no possibility of being used again or has virtually no possibility of being used again. The "unused list" holds the block information related to the block which is unused, that is, the block which has not yet been used. The "in-use list" holds the block information related to the block which is in use, that is, the block which has a high possibility of being used again. In the file system 23B, when the input/output of data related to the block of the buffer 12 ends, the kind of free list is determined depending on the kind of data input/output and the amount of data input/output, and the held block information is queued into the kind of free list which is determined.

According to this embodiment, three kinds of free lists are prepared, and the block information is held in one of the free lists depending on the state of the block within the buffer 12. For this reason, it is possible to independently manage the block information related to the used block, the unused block and the in-use block. Therefore, it is possible to accurately predict the block which has a low possibility of being used in the future, thereby making it possible to improve the utilization efficiency of the buffer region of the buffer 12. As a result, it is also possible to improve the performance of the computer system as a whole.

Figure 19:
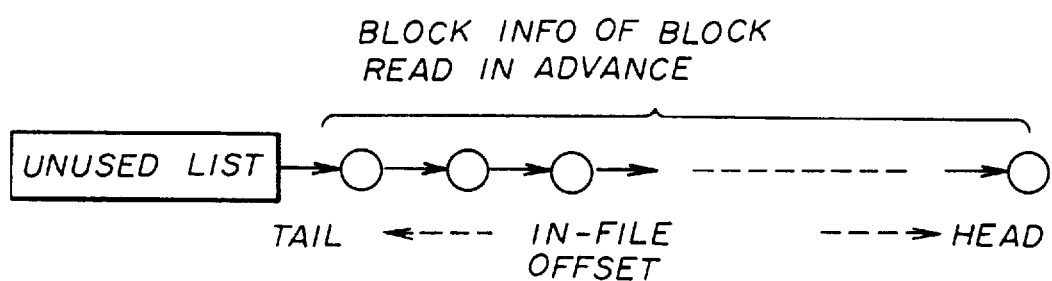
FIG. 19 is a diagram for explaining a second embodiment of the buffer management method according to the present invention.

Next, a description will be given of a second embodiment of the buffer management method according to the present invention, by referring to FIG. 19. In this embodiment, an input file (unused input file) before being used is read into the high-speed buffer 12 from the low-speed disk 14 in advance, so as to increase the execution speed of the program. When queuing into the "unused list" the block information related to the block of the buffer 12 storing the file which was read in advance, the position of this block within the file is taken into consideration. More particularly, the block information related to the block located more towards the leading part of the file is queued into a position more towards the tail part of the "unused list", and the block information related to the block located more towards at the last part of the file is queued into a position more towards the head part of the "unused list".

When the application 22 makes sequential access to the file from the leading part thereof, those blocks which store data located more towards the leading part of the file have a higher possibility of being used in the near future. Hence, this embodiment employs the above described queuing technique with respect to the data which are read in advance, so that those blocks located more towards the leading part of the file have a lower probability of being taken over by another application 22. For this reason, it is possible to secure a region within the buffer 12 for the data located at the leading part of the file with a priority over the data located at other parts of the file. As a result, it is possible to improve the input speed of the program which makes the sequential access, and accordingly improve the performance of the computer system as a whole.

Figure 20:
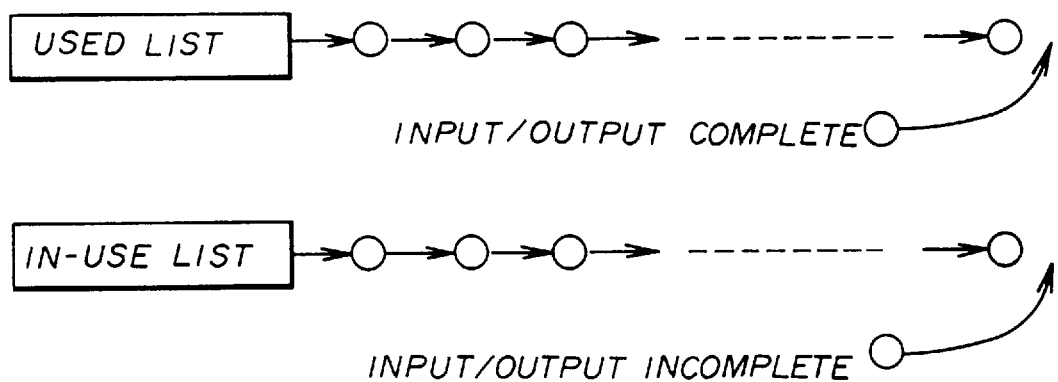
FIG. 20 is a diagram for explaining a third embodiment of the buffer management method according to the present invention.

Next, a description will be given of a third embodiment of the buffer management method according to the present invention, by referring to FIG. 20. In the file system 23B, the block information of the buffer 12 is stored in the free list after processing the file input/output request from the application 22. In this embodiment, a judgement is made as to whether or not the data input/output with respect to the entire block of the buffer 12 has been completed. If it is found as a result of the judgement that the data input/output has been completed, the block information related to the corresponding block is queued into the "used list". On the other hand, if it is found as a result of the judgement that the data input/output has not been completed, the block information related to the corresponding block is queued into the "in-use list".

In the case of the application 22 which makes one sequential access, there is virtually no possibility of using again the data to which one access has already been made. Hence, this embodiment distinguishes those blocks for which the data input/output with respect to the entire block has been completed and those blocks for which the data input/output with respect to the entire block has not been completed, and manages the distinguished blocks. Hence, it is possible to maintain in the "in-use list" the block information which is related to the block with respect to which the data input/output has not been completed for the entire block with a priority over other block information. As a result, it is possible to improve the utilization efficiency of the buffer 12 and also improve the performance of the computer system as a whole.

Figure 21:
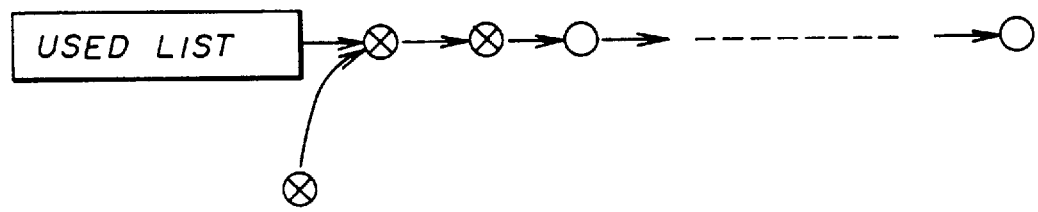
FIG. 21 is a diagram for explaining a fourth embodiment of the buffer management method according to the present invention.

Next, a description will be given of a fourth embodiment of the buffer management method according to the present invention, by referring to FIG. 21. In this embodiment, if a file delete request is issued from the application 22, the file system 23B invalidates all of the blocks which are within the buffer 12 and store the data of the corresponding file which is to be deleted. In addition, the block information related to the invalid block is queued into the head of the "used list".

In other words, this embodiment queues the block information which is related to the invalid block into the free list by distinguishing such block information from the block information which is related to the valid block. In FIG. 21, the block information related to the valid block is indicated by a plain circular mark, and the block information related to the invalid block is indicated by a circular mark with an "X". Therefore, it is possible to use the block which stores the invalid data for storing other data with priority over other blocks, and maintain the block which stores the valid data with a priority over other blocks so that the block which stores the valid data will not be used for storing other data. As a result, it is possible to improve the utilization efficiency of the buffer 12 and improve the performance of the computer system as a whole.

Figure 22:
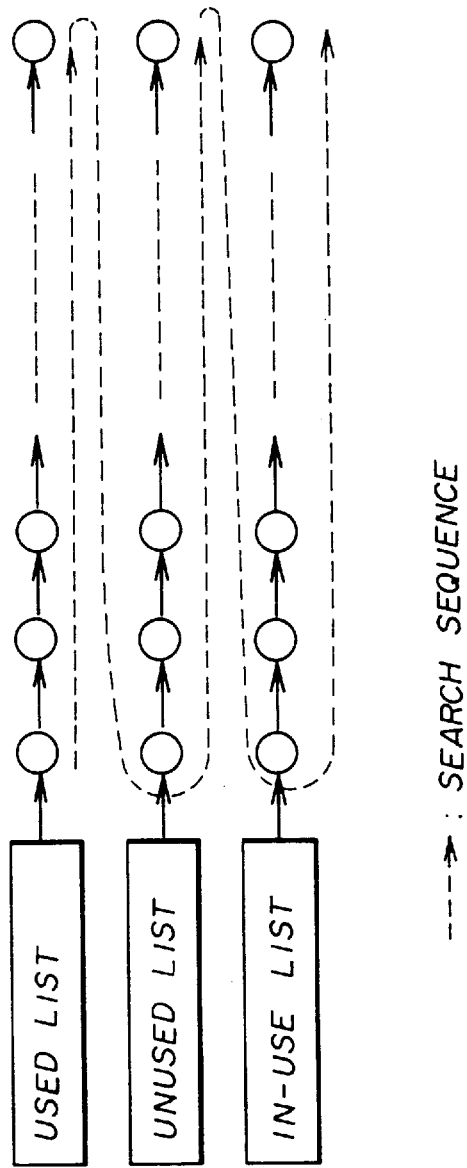
FIG. 22 is a diagram for explaining a fifth embodiment of the buffer management method according to the present invention.

Next, a description will be given of a fifth embodiment of the buffer management method according to the present invention, by referring to FIG. 22. In this embodiment, when a file input/output request is issued from the application program 22, the file system 23B investigates whether or not the corresponding data related to the requested file are stored within the buffer 12. If the corresponding data do not exist within the buffer 12, a new block of the buffer 12 is allocated therefor. When making this allocation, the free lists are searched in a sequence starting from the "used list", then to the "unused list" and further to the "in-use list", and the block of the block information which is found first is selected.

In this embodiment, the three kinds of free lists are successively searched starting from the block information related to the block which stores the data which is least likely to be used in the future. For this reason, the possibility of those data having a higher possibility of being used in the future have a lower probability of being taken up by other requests. Accordingly, it is possible to improve both the utilization efficiency of the buffer 12 and the performance of the computer system as a whole.

Next, a description will be given of a sixth embodiment of the buffer management method according to the present invention, by referring to FIG. 23. In this embodiment, the file system 23B holds map information related to the entire buffer region of the buffer 12 which is divided into blocks as shown in FIG. 23. The amount of data which is already subjected to the input/output process, that is, the access count, is recorded in the entry of each block within the map. It is judged that the data input/output of the entire block is completed when this amount of data reaches the block size of the buffer 12.

In order to correctly judge the completion and incompletion of the data input/output of the entire block of the buffer 12 with respect to an arbitrary access pattern, it is necessary to record the existence of the access for each minimum unit of the accessible data, where the minimum unit is 1 byte, for example. In this case, however, the required memory capacity and the required processing time would both increase. But in this embodiment, when the application program 22 makes one sequential access to the file, for example, it is regarded that there is virtually no possibility of making access to the same buffer region a plurality of times. Hence, although this embodiment only records the amount of data to which the access has been made for each block of the buffer 12, that is, the access count, it is still possible to correctly judge the completion and incompletion of the data input/output of the entire block of the buffer 12.

Figure 24:
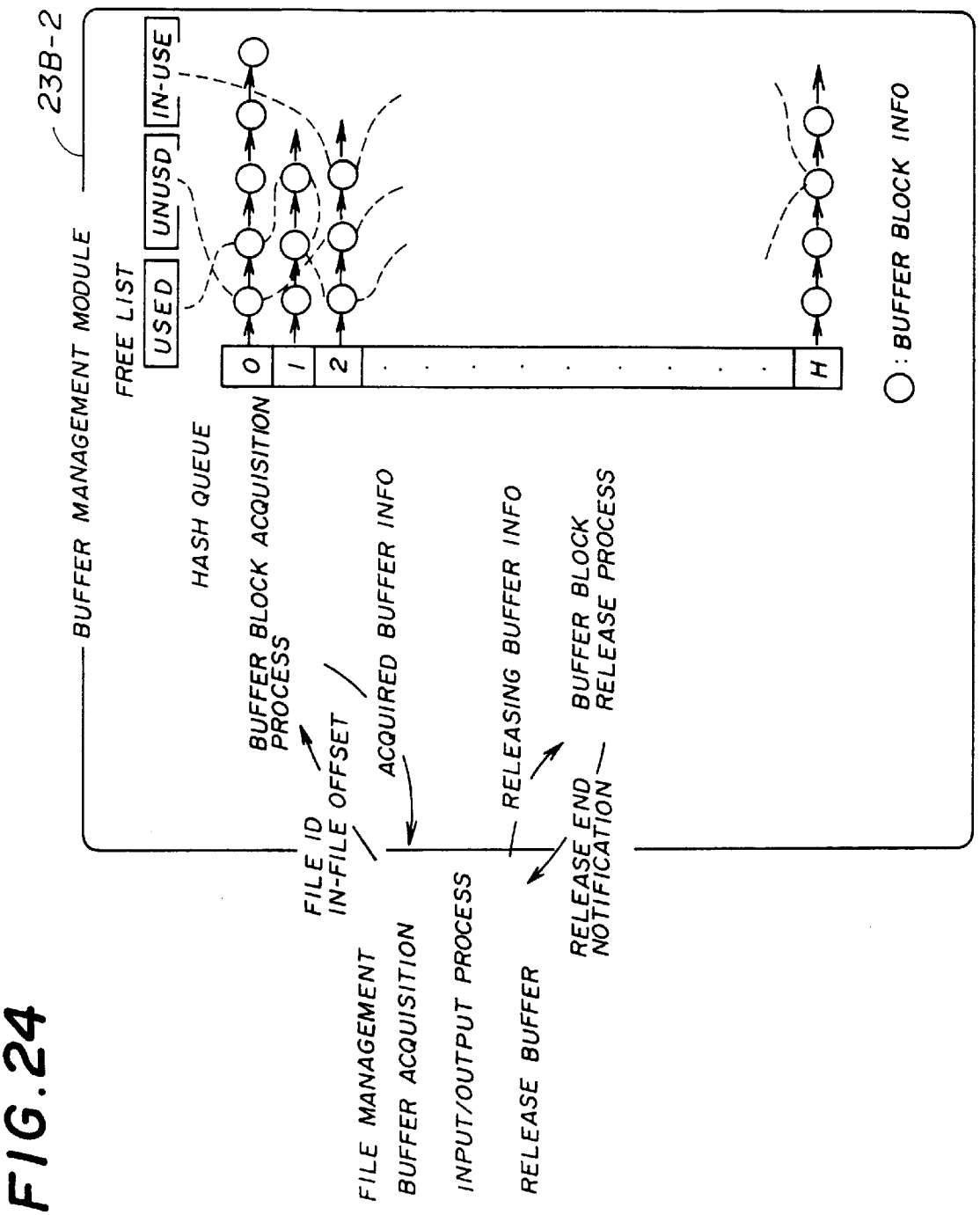
FIG. 24 is a diagram showing the construction of a buffer management module.

FIG. 24 shows the construction of the buffer management module 23B2 shown in FIG. 17. In FIG. 24, the circular mark indicates the block information.

As shown in FIG. 24, the buffer management module 23B2 is divided into a block acquisition process part and a block release process part. In addition, the buffer management module 23B2 holds data structures of hash queues, free lists and the like for managing the buffer 12 in blocks. The hash queue holds in the form of a list the block information related to the block in which the valid data is stored, for each hash value which uses the file ID number and the in-file offset as keys. As described above, there are three kinds of free lists, namely, the "used list", the "unused list" and the "in-use list". The free list holds in the form of a list the block information related to the block which is the subject of the take over when a block is newly allocated for the data.

The file management module 23B1 calls the block acquisition process part when making the data input/output via the buffer 12, and obtains the block information related to the block of the buffer 12. In addition, the file management module 23B1 uses the buffer region which is described in the obtained block information to make the data input/output. When the data input/output ends for the corresponding block of the buffer 12, the file management module 23B1 calls the block release process part, and corresponding block of the buffer 12 so that the block can be used for another purpose.

Figure 25:
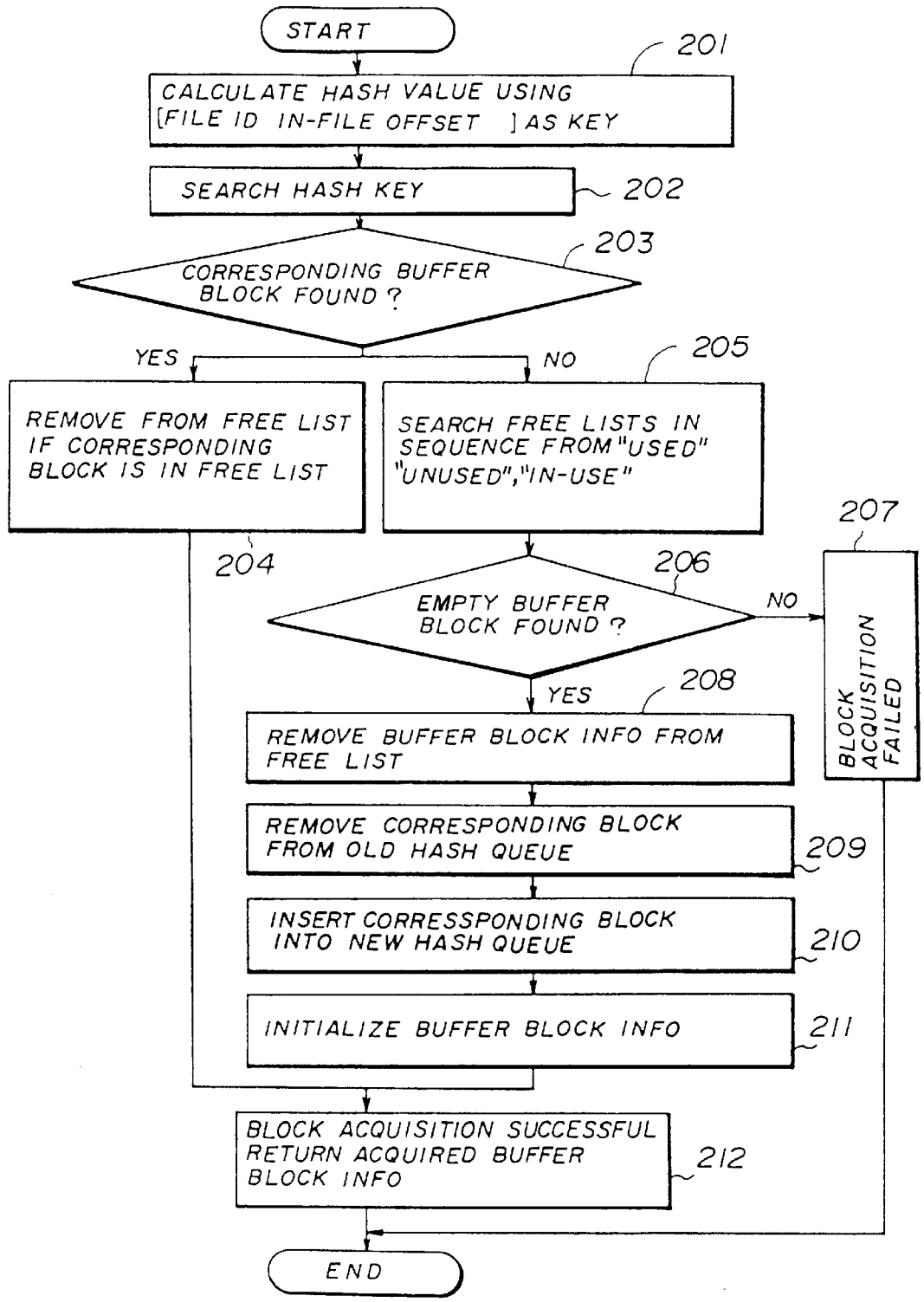
FIG. 25 is a flow chart for explaining a block acquisition process.

Next, a description will be given of the block acquisition process of the block acquisition process part, by referring to FIG. 25. FIG. 25 corresponds to the step 23B-13 in FIG. 6.

In FIG. 25, a step 201 calculates the hash value which uses the file ID number and the in-file offset as the keys. A step 202 makes a search in the hash queue using the hash value. A step 203 decides whether or not block information corresponding to the hash value exists within the hash queue. If the corresponding block information exits within the hash queue and the decision result of the step 203 is YES, the process advances to a step 204. If the corresponding block information is included in the free list, the step 204 removes this block information from the free list.

On the other hand, if the decision result of the step 203 is NO, a step 205 makes a search in the free lists in a sequence starting from the "used list", then to the "unused list" and further to the "in-use list". A step 206 decides whether or not block information related to an empty block exists as a result of the search made in the step 205. If the decision result of the step 206 is NO, a step 207 detects the failure of the block acquisition process, and the process ends.

But if the decision result in the step 206 is YES, a step 208 removes the block information related to the empty block from the free list. In addition, a step 209 removes the corresponding block information from the old hash queue, and a step 210 inserts the corresponding block information into a new hash queue. A step 211 initializes the block information.

After the step 204 or 211, a step 212 detects the success of the block acquisition process and returns the acquired block information to the file management module 23B1 of the file system 23B. Hence, the step 212 corresponds to the step 23B-14 shown in FIG. 6.

The step 205 corresponds to the fifth embodiment of the buffer management method described above.

Figure 26:
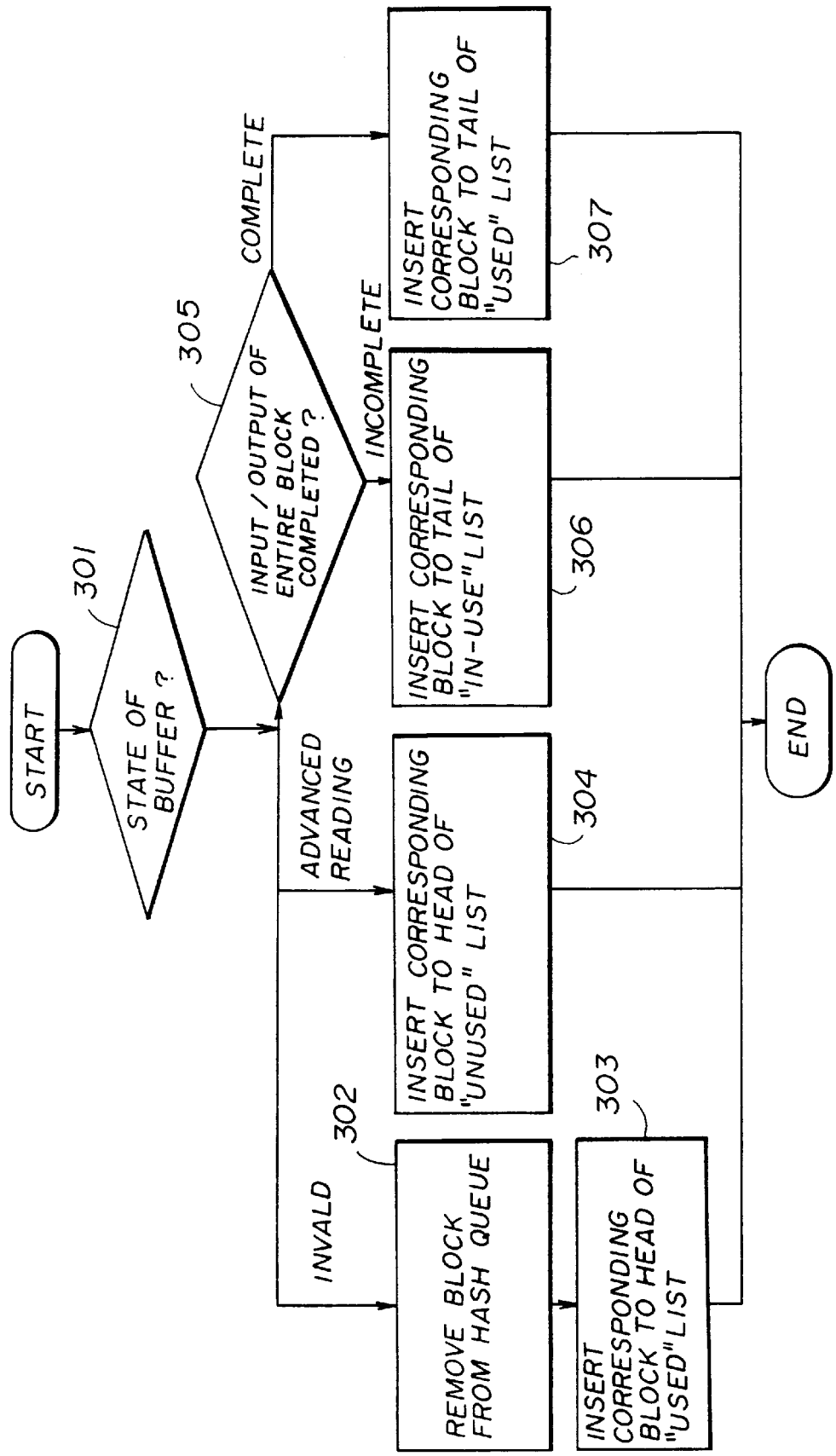
FIG. 26 is a flow chart for explaining a block release process.

Next, a description will be given of the block release process of the block release process part, by referring to FIG. 26. FIG. 26 corresponds to the step 23B-17 shown in FIG. 6.

In FIG. 26, a step 301 judges the state of the buffer 12. The process advances to a step 302, 304 or 305 depending on the result of this judgement.

If the step 301 judges that a block is invalid, the step 302 removes the block information related to this invalid block from the hash queue. A step 303 queues the block information related to the invalid block into the head part of the "used list", and the process ends. Accordingly, the steps 302 and 303 correspond to the fourth embodiment of the buffer management method.

If the step 301 judges that the input file which has not been used is already read into the buffer 12 from the disk 14 by the advanced reading, the step 304 queues the block information related to the block of the buffer 12 storing this input file into the "unused list" by taking into consideration the in-file offset of this block, and the process ends. In other words, the queuing is made so that the block information related to those blocks located more towards the leading part of the file are queued into a position more towards the tail part of the "unused list", and the block information related to those blocks located more towards the last part of the file are queued into a position more towards the head part of the "unused list". Accordingly, the step 304 corresponds to the second embodiment of the buffer management method.

If the step 301 detects no invalid block or detects no advanced reading of the data, the step 305 decides whether or not the data input/output of the entire block has been completed. If it is found that the data input/output of the entire block has not been completed as a result of the decision of the step 305, a step 306 queues the block information related to the corresponding block into the tail part of the "in-use list", and the process ends. On the other hand, if it is found that the data input/output of the entire block has been completed, a step 307 queues the block information related to the corresponding block into the tail part of the "used list", and the process ends. Hence, the step 306 or 307 corresponds to the third embodiment of the buffer management method.

The step 305 can make the decision in the following manner. That is, first, the data length to be input/output is divided for each block size based on the file ID number, the offset and the data length of the file, for each of the blocks. In addition, the block of the buffer 12 is acquired using the file ID number and the offset of the file. Hence, the data is transferred from the disk 14 to the buffer 12 or, from the buffer 12 to the disk 14. In this case, the amount of access data of the block related to the data transfer is updated in the map information shown in FIG. 23. As a result, it the amount of access data is greater than or equal to the block size, the buffer information indicates that the data input/output has been completed for the entire corresponding block. On the other hand, if the amount of access data is smaller than the block size, the buffer information indicates that the data input/output has not been completed for the entire corresponding block. Finally, the file management module 23B1 of the file system 23B is notified of the block information and the buffer state, and the corresponding block of the buffer 12 is released.

In each of the embodiments of the buffer management method described above, the main storage 12 is used as the buffer for the sake of convenience. However, if the buffer management method is applied to the computer system shown in FIG. 1, it is of course possible to use the disk cache 15 as the buffer.

Further, the present invention is not limited to these embodiments, but various variations and modifications may be made without departing from the scope of the present invention.

What is claimed is:

1. A buffer management method adapted to a computer system comprising a central processing unit, buffer means and a secondary storage, said buffer management method managing a buffer region of the buffer means in blocks when making a data transfer between the secondary storage and the buffer means, said buffer management method comprising the steps of:

(a) preparing at least three kinds of free lists which hold block information related to blocks of the buffer means which are subject to take over by another block, said three kinds of free lists including a "used list" including block information having a low possibility of being used again, an "unused list" including unused block information and an "in-use list" including block information having a high possibility of being used again; and (b) if the data transfer with respect to a block of the buffer means ends, releasing this block by queuing block information related to this block into one of the free lists selected depending on a state of the buffer means.

2. The buffer management method as claimed in claim 1, wherein said state of the buffer means includes kind of data transfer and amount of data transfer.

3. The buffer management method as claimed in claim 1, which further comprises the step of:

(c) when releasing a block of the buffer means after reading of data related to a file into this block in advance from the secondary storage ends, changing queuing of block information related to this block into one of the free lists depending on a position of this block within the file.

4. The buffer management method as claimed in claim 3, wherein said step (c) queues the block information related to those blocks located more towards the leading part of the file into a position more towards the tail part of the "unused list", and the block information related to those blocks located more towards the last part of the file into a position more towards the head part of the "unused list".

5. The buffer management method as claimed in claim 1, which further comprises the step of:

(c) when releasing a block of the buffer means after a data transfer between the secondary storage and this block of the buffer means ends, changing queuing of block information related to this block into one of the free lists based on whether or not the data transfer is completed for the entirety of this block.

6. The buffer management method as claimed in claim 5, wherein said step (c) queues the block information related to a corresponding block into the "used list" when the data transfer is completed, and queues the block information related to the corresponding block into the "in-use list" when the data transfer is incompleted.

7. The buffer management method as claimed in claim 1, which further comprises the step of:

(c) when releasing a block corresponding to a file by invalidating this block at a time when this file is erased, queuing block information related to the invalid block into one of the free lists in a manner distinct from a normal data transfer between the secondary storage and a block of the buffer means.

8. The buffer management method as claimed in claim 7, wherein said step (c) queues the block information related to the invalid block into a head part of the "used list".

9. The buffer management method as claimed in claim 1, which further comprises the step of:

(c) when newly allocating a block with respect to a file, obtaining block information related to a block which can be allocated by searching the three kinds of free lists in a sequence starting from the "used list", then the "unused list" and further the "in-use list".

10. The buffer management method as claimed in claim 9, which further comprises the step of:

(d) determining a block which can be allocated based on block information which is found first as a result of the search.

11. The buffer management method as claimed in claim 1, which further comprises the steps of:

(c) updating map information related to a buffer region of the buffer means every time a data transfer is made between the secondary storage and a block of the buffer means; and (d) judging whether or not the data transfer has been completed for the entire block based on said map information.

12. The buffer management method as claimed in claim 11, wherein the map information records an amount of data which has already been transferred, and said step (d) detects the completion of the data transfer when the amount of data reaches a block size.

13. A file system adapted to a computer system comprising a central processing unit, buffer means and a secondary storage, said file system making a data transfer between the secondary storage and the buffer means in blocks, said file system comprising:

means for preparing at least three kinds of free lists which hold block information related to blocks of the buffer means which are subject to take over by another block, said three kinds of free lists including a "used list" including block information having a low possibility of being used again, an "unused list" including unused block information and an "in-use list" including block information having a high possibility of being used again; and means for releasing a block of the buffer means by queuing block information related to this block into one of the free lists selected depending on a state of the buffer means if the data transfer with respect to this block of the buffer means ends.

14. The file system as claimed in claim 13, wherein said state of the buffer means includes kind of data transfer and amount of data transfer.

15. The file system as claimed in claim 13, which further comprises:

means for changing queuing of block information related to a block of the buffer means into one of the free lists depending on a position of this block within a file when releasing this block of the buffer means after reading of data related to the file into this block in advance from the secondary storage ends.

16. The file system as claimed in claim 15, wherein said means for changing queuing queues the block information related to those blocks located more towards the leading part of the file into a position more towards the tail part of the "unused list", and the block information related to those blocks located more towards the last part of the file into a position more towards the head part of the "unused list".

17. The file system as claimed in claim 13, which further comprises:

means for changing queuing of block information related to a block of the buffer means into one of the free lists based on whether or not the data transfer is completed for the entirety of this block when releasing this block of the buffer means after a data transfer between the secondary storage and this block of the buffer means ends.

18. The file system as claimed in claim 17, wherein said means for changing queuing queues the block information related to a corresponding block into the "used list" when the data transfer is completed, and queues the block information related to the corresponding block into the "in-use list" when the data transfer is incompleted.

19. The file system as claimed in claim 13, which further comprises:

means for queuing block information related to an invalid block into one of the free lists in a manner distinct from a normal data transfer between the secondary storage and a block of the buffer means when releasing the invalid block corresponding to a file by invalidating this invalid block at a time when this file is erased.

20. The file system as claimed in claim 19, wherein said means for queuing queues the block information related to the invalid block into a head part of the "used list".

21. The file system as claimed in claim 13, which further comprises:

means for obtaining block information related to a block which can be allocated by searching the three kinds of free lists in a sequence starting from the "used list", then the "unused list" and further the "in-use list" when newly allocating a block with respect to a file.

22. The file system as claimed in claim 21, which further comprises:

means for determining a block which can be allocated based on block information which is found first as a result of the search.

23. The file system as claimed in claim 13, which further comprises:

means for updating map information related to a buffer region of the buffer means every time a data transfer is made between the secondary storage and a block of the buffer means; and means for judging whether or not the data transfer has been completed for the entire block based on said map information.

24. The file system as claimed in claim 23, wherein the map information records an amount of data which has already been transferred, and said means for judging detects the completion of the data transfer when the amount of data reaches a block size.

* * * * *